United States Patent
Ghovanloo et al.

(10) Patent No.: US 8,044,766 B2
(45) Date of Patent: Oct. 25, 2011

(54) TONGUE OPERATED MAGNETIC SENSOR BASED WIRELESS ASSISTIVE TECHNOLOGY

(75) Inventors: Maysam Ghovanloo, Atlanta, GA (US); Gautham Krishnamurthy, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 290 days.

(21) Appl. No.: 12/084,227

(22) PCT Filed: Oct. 31, 2006

(86) PCT No.: PCT/US2006/042346
§ 371 (c)(1), (2), (4) Date: Sep. 14, 2009

(87) PCT Pub. No.: WO2007/053562
PCT Pub. Date: May 10, 2007

(65) Prior Publication Data
US 2010/0007512 A1 Jan. 14, 2010

Related U.S. Application Data

(60) Provisional application No. 60/731,731, filed on Oct. 31, 2005.

(51) Int. Cl.
*G09B 21/00* (2006.01)
(52) U.S. Cl. .............. 340/4.11; 340/4.1; 340/539.12; 340/539.22

(58) Field of Classification Search ............. 340/825.19, 340/4.11; 702/116; 600/590; 178/18.03, 178/18.07; 323/355; 324/207.11
See application file for complete search history.

(56) References Cited

U.S. PATENT DOCUMENTS

| 4,054,746 | A | * | 10/1977 | Kamm ...................... 178/18.03 |
| 4,303,077 | A | | 12/1981 | Lewin et al. |
| 4,334,542 | A | * | 6/1982 | Takinishi et al. ............ 600/383 |
| 5,212,476 | A | * | 5/1993 | Maloney .................... 340/4.11 |
| 5,282,711 | A | | 2/1994 | Frische |

(Continued)

FOREIGN PATENT DOCUMENTS
WO WO2007/053562 5/2007

OTHER PUBLICATIONS

Barea et al., "E.O.G. guidance of a wheelchair using neural networks," Proceedings of the 15th International Conference on Pattern Recognition. vol. 4 pp. 668-671 (2000).

(Continued)

*Primary Examiner* — Benjamin C Lee
*Assistant Examiner* — Peter Mehravari
(74) *Attorney, Agent, or Firm* — Jenkins, Wilson, Taylor & Hunt, P.A.

(57) ABSTRACT

An assistive apparatus and method for remote control of an appliance by a subject are provided. The apparatus can comprise a tracer unit affixed to the tongue of the subject such that a change in position of the tongue changes position of the tracer; at least one sensor for detecting a position of the tracer unit; and a transmitter for transmitting a sensor signal to an appliance based on the detected position of the tracer unit, wherein the sensor signal effects control of the appliance. A method for tracking movement, position, or both of a tongue in a subject using the assistive apparatus is also provided.

72 Claims, 11 Drawing Sheets

U.S. PATENT DOCUMENTS

| | | | | |
|---|---|---|---|---|
| 5,460,186 | A | * | 10/1995 | Buchhold .................. 600/590 |
| 5,689,246 | A | * | 11/1997 | Dordick et al. ................ 341/21 |
| 5,692,517 | A | | 12/1997 | Junker |
| 6,370,700 | B1 | | 4/2002 | Arion |
| 6,503,197 | B1 | | 1/2003 | Nemirovski |
| 6,546,431 | B1 | | 4/2003 | Brown et al. |
| 6,598,006 | B1 | * | 7/2003 | Honda et al. ................. 702/116 |
| 6,636,763 | B1 | | 10/2003 | Junker et al. |
| 6,647,368 | B2 | | 11/2003 | Nemirovski |
| 6,671,379 | B2 | | 12/2003 | Nemirovski |
| 6,771,190 | B2 | | 8/2004 | Gordon |
| 6,833,786 | B1 | | 12/2004 | Sun et al. |
| 6,847,725 | B1 | | 1/2005 | Neuman et al. |
| 6,971,993 | B2 | * | 12/2005 | Fletcher .................... 600/587 |
| 7,071,844 | B1 | | 7/2006 | Moise |
| 7,091,875 | B2 | * | 8/2006 | Ondracek ................... 340/4.11 |
| 2009/0051564 | A1 | * | 2/2009 | Najanguaq Sovso Andreasen Strujik .................... 340/825.19 |
| 2010/0007512 | A1 | | 1/2010 | Ghovanloo et al. |

OTHER PUBLICATIONS

Rinard et al., "An Infrared System for Determining Ocular Position," ISA Transactions. vol. 19, No. 4 pp. 3-6 (1980).

Young, L.R., and Sheena, D., "Methods & Designs. Survey of eye movement recording methods," Behavior Research Methods & Instrumentation. vol. 7, No. 5 pp. 397-429 (1975).

Allegro A1321, Ratiometric Linear Hall Effect Sensor ICs for High-Temperature Operation, data sheet, Available: http://www.allegromicro.com/datafile/1321.pdf (13 pages) (Accessed on May 13, 2011).

Allegro A1391, Micro Power 3 V Linear Hall Effect Sensor with Tri-State Output and User-Selectable Sleep Mode, datasheet, Available: http://www.allegromicro.com/en/Products/Part_Numbers/1391/ (2 pages) (Accessed on May 13, 2011).

Assistive Products: Technology Devices. Available: http://www.wheelchairnet.org/WCN_ProdServ/Products/OtherATprod.html (9 pages) (Accessed on May 13, 2011).

Barea et al., "System for Assisted Mobility Using Eye Movements Based on Electrooculography," IEEE Transactions on Neural Systems and Rehabilitation Engineering. vol. 10, No. 4 pp. 209-218 (2002).

Betke et al., "The Camera Mouse: Visual Tracking of Body Features to Provide Computer Access for People With Severe Disabilities," IEEE Transactions on Neural Systems and Rehabilitation Engineering. vol. 10, No. 1 pp. 1-10 (2002).

Beverina et al., "User adaptive BCIs: SSVEP and P300 based interfaces," PsychNology Journal. vol. 1, No. 4 pp. 331-354 (2003).

BrainGate™ Neural Interface System, Available: http://www.cyberkinetics.com/content/medicalproducts/braingate.jsp (2 pages) (Accessed on May 13, 2011).

Chen et al., "The New Design of an Infrared-Controlled Human-Computer Interface for the Disabled," IEEE Transactions on Rehabilitation Engineering. vol. 7, No. 4 pp. 474-481 (1999).

Chen, "Application of Tilt Sensors in Human-Computer Mouse Interface for People With Disabilities," IEEE Transactions on Neural Systems and Rehabilitation Engineering. vol. 9, No. 3 pp. 289-294 (2001).

Cyberlink™ Brainfingers™ Solution, http://www.brainfingers.com (accessed on May 13, 2011) (1 page).

Dryden, "Let's Get Physical (High-g Tolerance)," Code One Magazine Online. pp. 1-3 (1986). http://www.codeonemagazine.com/archives/1986/articles/apr_86/physical/index.html (accessed on Oct. 25, 2006).

Eco: Ultra Compact and Low Power Wireless Sensor Node, Available: http://embedded.ece.uci.edu/~kilby/eco.htm (5 pages) (Accessed on May 13, 2011).

Felzer, T., and Freisleben, B., "HaWCoS: The 'Hands-free' Wheelchair Control System," Proceedings of ASSETS. pp. 127-134 (2002).

Girardi, "Tongue-touch controls give Ben a more satisfying, self-sufficient lifestyle," TeamRehab Report. pp. 15-17 (1997).

Harrysson et al., "Application of SFF to Preoperative Planning and Surgical Rehearsal for Treatment of Limb Deformities in Dogs," Rapid Prototyping Journal. vol. 9, No. 1 pp. 37-42 (2003).

Hinterberger et al., "Brain-Computer Communication and Slow Cortial Potentials," IEEE Transactions on Biomedical Engineering. vol. 51 pp. 1011-1018 (2004).

HMC proportional devices, Available: http://www.hmc-products.com/index.php?id=456 (2 pages) (Accessed on May 13, 2011).

Http://orin.com/access/headmouse/index.htm (5 pages) (Accessed May 13, 2011).

Http://www.tinyos.net (1 page) (Accessed on May 13, 2011).

Huo et al., "Introduction and preliminary evaluation of the Tongue Drive System: Wireless tongue-operated assistive technology for people with little or no upper-limb function," Journal of Rehabilitation Research and Development. vol. 45, No. 6 pp. 921-930 (2008).

Hutchinson et al., "Human-Computer Interaction Using Eye-Gaze Input," IEEE Transactions on Systems, Man, and Cybernetics. vol. 19, No. 6 pp. 1527-1534 (1989).

Integrated Compass Sensor HMC6052. Honeywell. Preliminary Information, 6 pages, www.honeywell.com (2005).

Krishnamurthy, G., and Ghovanloo, M., "Tongue Drive: A Tongue Operated Magnetic Sensor Based Wireless Assistive Technology for People with Severe Disabilities," Proceedings of the IEEE International Symposium on Circuits and Systems. (ISCAS-2006), May 2006 (4 pages).

Lau, C., and O'Leary, S., "Comparison of Computer Interface Devices for Persons With Severe Physical Disabilities," The American Journal of Occupational Therapy. vol. 47, No. 11 pp. 1022-1030 (1993).

Linear/Angular/Rotary Displacement Sensors HMC1501/HMC1512. Honeywell Sensor Products, 4 pages.

Makeig et al., "A Natural Basis for Efficient Brain-Actuated Control," IEEE Transactions on Rehabilitation Engineering. vol. 8, No. 2 pp. 208-211 (2000).

Melexis, Hall Application Guide, Available: http://www.melexis.com/Asset.aspx?nID=3715 (49 pages) (Accessed on May 13, 2011).

National Institute of Neurological Disorders and Stroke (NINDS), NIH, "Spinal Cord Injury: Hope Through Research," Available: http://www.ninds.nih.gov/disorders/sci/detail_sci.htm (20 pages) (Accessed on May 13, 2011).

Natural Point, TrackIR, Available: http://www.eyecontrol.com/trackir/ (1 page) (Accessed on May 13, 2011).

Neural Signals Inc., Brain-Computer Interfacing, Available: http://www.neuralsignals.com/index.htm (1 page) (Accessed on May 13, 2011).

Notification Concerning Transmittal of International Preliminary Report on Patentability (Chapter I of the Patent Cooperation Treaty) corresponding to International Patent Application No. PCT/US2006/042346 dated May 15, 2008.

Notification of Transmittal of the International Search Report and the Written Opinion of the International Searching Authority, or the Declaration corresponding to International Patent Application No. PCT/US2006/042346 dated Oct. 23, 2007.

Nutt et al., "Tongue-mouse for quadriplegics," Journal of Micromechanics and Microengineering. vol. 8, No. 2 pp. 155-157 (1998).

PNI MicroMag2 2-Axis Magnetic Sensor Module, PNI Corporation, Santa Rosa, CA pp. 1-20 (2005).

Pregenzer, M. and Pfurtscheller, G., "Frequency component selection for an EEG-based brain to computer interface," IEEE Transactions on Rehabilitation Engineering. vol. 7, No. 4 pp. 413-419 (1999).

Radio Shack 64-1895, ⅛" rare earth permanent magents, Available: http://www.radioshack.com/product/index.jsp?productID=2102642 (1 page) (Accessed on May 13, 2011).

Salem, C., and Zhai, S., "An Isometric Tongue Pointing Device," CHI. Proceedings of the SIGCHI Conference on Human Factors in Computing Systems. pp. 22-27 (1997).

Schlageter et al., "Tracking system with five degrees of freedom using a 2D-array of Hall sensors and a permanent magnet," Sensors and Actuators A. vol. 92 pp. 37-42 (2001).

Shock Doctor Max mouth guard, Available: http://www.karatedepot.com/pr-mo-041.html (1 page) (Accessed on May 13, 2011).

Struijk, L.,N.,S.A., "An Inductive Tongue Computer Interface for Control of Computers and Assistive Devices," IEEE Transactions on Biomedical Engineering. vol. 53, No. 12, Part 2 pp. 2594-2597 (2006).

Takami et al., "Computer Interface to Use Head Movement for Handicapped People," IEEE Tencon. vol. 1 pp. 468-472 (1996).

WakeMed Rehabilitation Hospital, Raleigh, NC, Available: http://www.wakemed.org/topnav.cfm?id=25&oTopID=16 (1 page) (Accessed on May 13, 2011).

Weiss, "The Seeing Tongue: In-the-mouth electrodes give blind people a feel for vision," Science News Online. vol. 160, No. 9 pp. 1-7 (2001).

Wolpaw et al., "Brain-computer interfaces for communication and control," Clinical Neurophysiology. vol. 113, No. 6 pp. 767-791 (2002).

Xie et al., "Real-Time Eye Feature Tracking from a Video Image Sequence Using Kalman Filter," IEEE Transactions on Systems, Man, and Cybernetics. vol. 25, No. 12 pp. 1568-1577 (1995).

Zhao et al., "Detection of Pilot State During High-G by Wavelet Analysis of EEG Signal," Proceedings of the First Joint BMES/EMBS Conference, Serving Humanity, Advancing Technology. Oct. 13-16, 1999. Atlanta, Georgia, USA. p. 432.

"Comsol Multiphysics" (FEMLAB), Electromagnetics module, Available: http://www.comsol.com/products/multiphysics/ (1 page) (Accessed on May 17, 2011).

"Crossbow, TELOSB mote platform," Available: http://www.xbow.com/Products/Product_pdf_files/Wireless_pdf/TelosB_Datasheet.pdf (2 pages).

"Deciphering TinyOS Serial Packets," Octave Technology. Octave Tech Brief #5-01. pp. 1-9 (2005) http://www.octavetech.com/pubs/TB5-01%20Deciphering%20TinyOS%20Serial%20Packets.pdf.

"Head Arrays," Switch-It, Available: http://www.switchit-inc.com/switcheddrive.php (3 pages) (Accessed on May 17, 2011).

"Headway," Available: http://ace-centre.hostinguk.com/index.cfm?pageid=9FEE5A02-3048-7290-FE48D9CF794FF527 (3 pages) (accessed May 13, 2006).

"nRF24E1," 2.4GHz RF transceiver with embedded 8051 compatible microcontroller and 9 input, 10 bit ADC, Nordic Semiconductor ASA. pp. 1-107 (2006).

"Rapid Prototyping at NCSU," http://www.ie.ncsu.edu/cormier/rpm.htm (1 page) (Accessed May 18, 2011).

"Tongue Control Technology," Think-A-Move. Available: http://www.think-a-move.com/tongue.html (2 pages) (Accessed on May 18, 2011).

"Tongue movements allow quadriplegics to control computers," Physorg.com www.physorg.com/news105281895.html (3 pages) (Accessed on May 18, 2011).

Bello, "An Introduction to Augmentative and Alternative Communication," pp. 1-27 (2003).

Birbaumer et al., "The Thought Translation Device (TTD) for Completely Paralyzed Patients," IEEE Transactions on Rehabilitation Engineering. vol. 8, No. 2 pp. 190-193 (2000).

Blankertz et al., "The BCI Competition 2003: Progress and Perspectives in Detection and Discrimination of EEG Single Trials," IEEE Transactions on Biomedical Engineering. vol. 51, No. 6 pp. 1044-1051 (2004).

Borisoff et al., "Brain-Computer Interface Design for Asynchronous Control Applications: Improvements to the LF-ASD Asynchronous Brain Switch," IEEE Transactions on Biomedical Engineering. vol. 51, No. 6 pp. 985-992 (2004).

Crisman et al., "Using the Eye Wink Control Interface to Control a Powered Wheelchair," Annual International Conference of the IEEE Engineering in Medicine and Biology Society. vol. 13, No. 4 pp. 1821-1822 (1991).

Fabiani et al., "Conversion of EEG Activity Into Cursor Movement by a Brain-Computer Interface (BCI)," IEEE Transactions on Neural Systems and Rehabilitation Engineering. vol. 12, No. 3 pp. 331-338 (2004).

Keirn, Z.A., and Aunon, J.I., "A New Mode of Communication Between Man and His Surroundings," IEEE Transactions on Biomedical Engineering. vol. 37, No. 12 pp. 1209-1214 (1990).

Keirn, Z.A., and Aunon, J.I., "Man-Machine Communications Through Brain-Wave Processing," IEEE Engineering in Medicine and Biology Magazine. pp. 55-57 (1990).

LaCourse, J.R., and Hludik, Jr., F.C., "An Eye Movement Communication-Control System for the Disabled," IEEE Transactions on Biomedical Engineering. vol. 37, No. 12 pp. 1215-1220 (1990).

Lal et al., "Methods Towards Invasive Human Brain Computer Interfaces. Advances in Neural Information Processing Systems," MIT Press, Cambridge, MA, USA, vol. 17 pp. 737-744 (2005).

Law et al., "A Cap as Interface for Wheelchair Control," Proceedings of the 2002 IEEE/RSJ International Conference on Intelligent Robots and Systems. vol. 2 pp. 1439-1444 (2002).

Mazo et al., "Electronic Control of a Wheelchair Guided by Voice Commands," Control Engineering Practice. vol. 3, No. 5 pp. 665-674 (1995).

Paluš, "Nonlinearity in normal human EEG: cycles, temporal assymetry, nonstationarity and randomness, not chaos," Biological Cybernetics. vol. 75, No. 5 pp. 389-396 (1996).

Perkins, W.J., and Stenning, B.F., "Control units for operation of computers by severely physically handicapped persons," Journal of Medical Engineering & Technology. vol. 10, No. 1 pp. 21-23 (1986).

Reilly, R.B., and O'Malley, M.J., "Adaptive Noncontact Gesture-Based System for Augmentative Communication," IEEE Transactions on Rehabilitation Engineering. vol. 7, No. 2 pp. 174-182 (1999).

Schalk et al., "BCI2000: A General-Purpose Brain-Computer Interface (BCI) System," IEEE Transactions on Biomedical Engineering. vol. 51, No. 6 pp. 1034-1043 (2004).

Schott et al., "Novel Magnetic Displacement Sensors," IEEE Transactions on Sensors. pp. 1-8 (2002).

Simpson, R.C., and Levine, S.P., "Voice Control of a Powered Wheelchair," IEEE Transactions on Neural Systems and Rehabilitation Engineering. vol. 10, No. 2 pp. 122-125 (2002).

Cook, A.,M., and Hussey, S.M., "Assistive Technologies: Principles and Practice," 2nd edition. Mosby, Inc. St. Louis, Missouri (2002).

Komiya et al., "Guidance of a Wheelchair by Voice," IEEE Conf. Industrial Electronics. vol. 1 pp. 102-107 (2000).

* cited by examiner

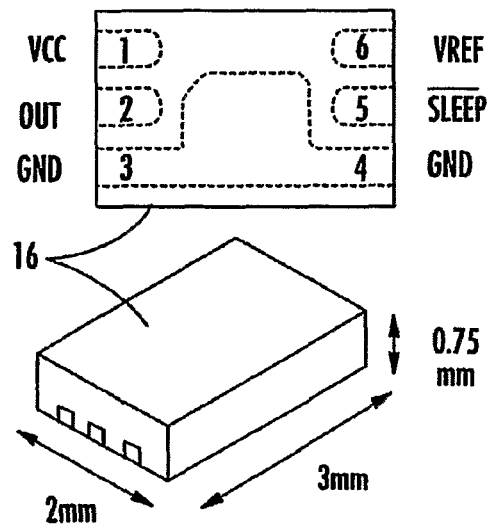
*FIG. 4*
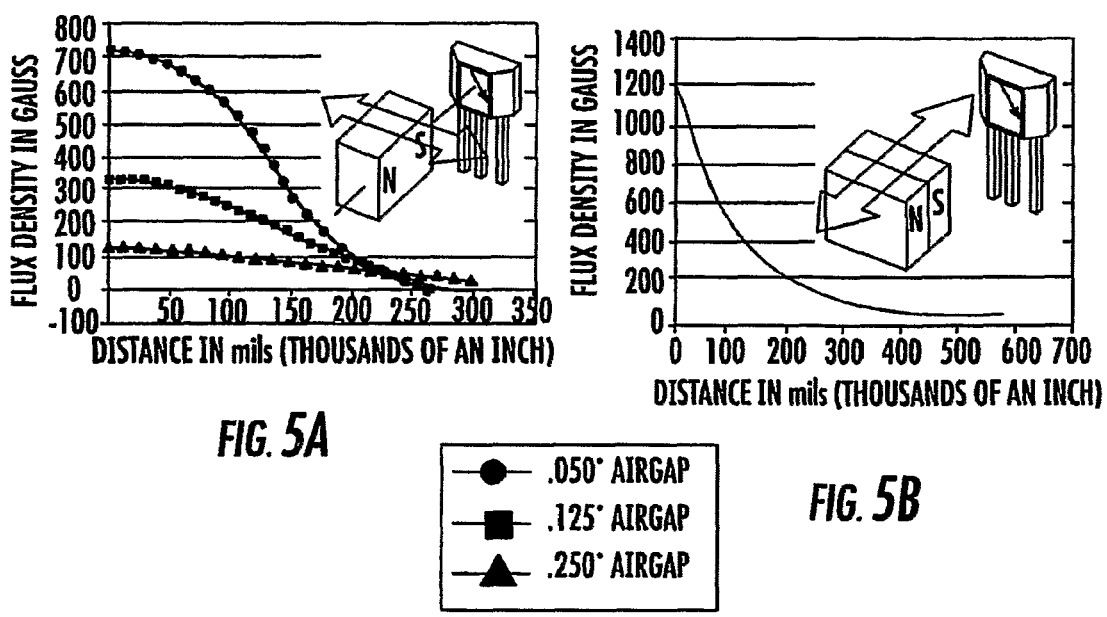
*FIG. 5A*
*FIG. 5B*

TONGUE OPERATED MAGNETIC SENSOR BASED WIRELESS ASSISTIVE TECHNOLOGY

CROSS-REFERENCE TO RELATED APPLICATIONS

This application claims the benefit of U.S. Provisional Patent Application Ser. No. 60/731,731, filed Oct. 31, 2005; the disclosure of which is incorporated herein by reference in its entirety.

TECHNICAL FIELD

The presently disclosed subject matter relates to an apparatus for remote control of an appliance by a subject and methods of using the apparatus. In particular, the presently disclosed subject matter relates to an apparatus for remote control of an appliance by way of a tracer unit affixed to the tongue of a subject and at least one sensor for detecting a position of the sensor, wherein movement of the tongue by the subject effects control of an appliance.

BACKGROUND

Assistive technologies are important for people with severe disabilities to lead a self-supportive, independent life. Persons severely disabled as a result of causes ranging from traumatic brain and spinal cord injuries to stroke generally find it extremely difficult to carry out everyday tasks without continuous assistance. Assistive technologies that help them communicate their intentions and effectively control their environment, especially to operate a computer, can greatly improve the quality of life for this group of people and may even help them to be employed.

Several assistive technology devices are presently available that are controlled by switches. For example, the switch integrated hand splint, blow-n-suck (sip-n-puff) device, chin control system, and electromyography (EMG) switch are all switch-based systems and can provide the user with some limited degrees of freedom. A group of head-mounted assistive devices has been developed that emulate a computer mouse with head movements. Cursor movements in these devices are controlled by tracking an infrared beam emitted or reflected from a transmitter or reflector attached to the user's glasses, cap, or headband (Chen et al. 1999; Takami et al., 1996). Tilt sensors and video-based computer interfaces that can track a facial feature have also been implemented (Chen, 2001; Betke et al., 2002). A limitation of these devices is that only those people whose head movement is not inhibited can avail of the technology. Another limitation is that the subject's head should always be in positions within the range of the device sensors. For example the controller may not be accessible when the subject is lying in bed or not sitting in front of a computer.

Another category of computer access systems used in assistive technologies operate by tracking eye movements from corneal reflections (Hutchinson et al., 1989) and pupil position. Electro-oculographic (EOG) potential measurements (Xie et al., 1995; Gips et al., 1993) have also been used for detecting eye movements. A limitation of these devices is that they affect the subject's eyesight by requiring extra eye movements that can interfere with the subject's normal visual activities such as reading, writing, and watching.

Some available assistive devices can provide proportional control. Most of these devices, however, require some degree of physical ability such as foot movement, hand or finger movements, or head movement. The needs of persons with severe motor disabilities such as those with amyotrophic lateral sclerosis (ALS) or middle to advanced locked-in syndrome, who cannot benefit from mechanical movements of any extremities can potentially be addressed by utilizing electric signals originated from brain waves or muscle twitches. Such brain computer interfaces (BMI), either invasive, or noninvasive have been the subjects of extensive research activities (Lal et al., 2005). For example, BRAINFINGERS™ (Brain Actuated Technologies, Inc., Dayton, Ohio, U.S.A.) is a non-invasive solution consisting of a headband with three electrodes that sense and respond to surface electrical signals generated from forehead muscles, eye movements, and brainwave activities. THINK-A-MOVE™ (Think-A-Move, Ltd., Beachwood, Ohio, U.S.A.) is another interface platform, which utilizes the capabilities of the ear as an output device. BRAINGATE™ (Cyberkinetics Neurotechnology Systems, Inc., Foxborough, Mass., U.S.A.), on the other hand, is an example of an invasive technology using intracortical electrodes to record brain signals from the motor cortex area. All of these technologies rely on signal processing and complex computational algorithms, which can results in delays or significant costs. These technologies can also be susceptible to external noise and interferences. In addition, the subjects may not want to go through a brain surgery for the sake of regaining partial control over their environment.

Very few assistive technologies presently available have made a successful transition outside research laboratories and are widely utilized by severely disabled individuals. Financial, technical, and psychophysical factors affect the acceptance rate of an assistive technology. Among factors beneficial for adopting an assistive technology are the ease of usage and convenience in control. Operating the assistive device should desirably be easy to learn and require minimum effort on the subject's part. The device is desirably small, unobtrusive, low cost, and non- or minimally invasive. Finally, a factor that is often overlooked, but important to a disabled subject, is that the device is desirably cosmetically acceptable. Therefore, there is presently an unmet need for assistive technologies for the disabled that provide some or even all of such features.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments of the presently disclosed subject matter, an assistive apparatus for remote control of an appliance by a subject is provided. In some embodiments, the apparatus comprises a tracer unit adapted for non-obstructive affixation to the tongue of the subject such that a change in position of the tongue changes position of the tracer; at least one sensor for detecting a position of the tracer unit and adapted for non-obstructive placement proximal the tracer unit; and a sensor control unit for transmitting a sensor signal to an appliance based on the detected position of the tracer unit.

In some embodiments, the tracer unit comprises a magnet, which in some embodiments can be a permanent magnet exhibiting straight-line normal demagnetization curve properties. In some embodiments, magnet comprises a flexible magnet, a rare earth magnet (e.g., a neodymium-iron-boron magnet or a samarium-cobalt magnet) or a ceramic magnet. In some embodiments, the apparatus comprises a post adapted for piercing the tongue to which the tracer unit is attached. In other embodiments, the tracer unit is adapted for affixation to the tongue by embedding the tracer unit within the tongue. In other embodiments, the tracer unit is adapted for affixation to the tongue by a tissue adhesive. In some embodiments, the tracer unit is encased within a biocompatible material (e.g., gold, platinum, a ceramic, a polymeric material, or combinations thereof).

In some embodiments, the at least one sensor is adapted for incorporation into a dental fixture fitted into the mouth of the subject. In other embodiments, the at least one sensor is adapted for positioning outside the mouth of the subject. In some embodiments, the at least one sensor is a plurality of sensors and the apparatus comprises power management circuitry for controlling power distribution to the plurality of sensors. In some embodiments, the at least one sensor is a Hall-effect magnetic sensor, a magnetoinductive sensor, or a magnetoresistive sensor.

In some embodiments, the sensor control unit processes the sensor signal from an analog signal to a digital signal. In some embodiments, the sensor control unit comprises a wireless transmitter for transmitting the sensor signal by wireless communication.

In some embodiments, the appliance is selected from the group consisting of a personal computer, a wheelchair, a bed, a telephone, a home appliance, and a speech synthesizer. In some embodiments, the appliance is a personal computer and the apparatus effects control of software on the personal computer that tracks movement, position, or both of the tongue.

In some embodiments, the apparatus comprises an appliance control unit for receiving the sensor signal from the sensor control unit, translating the sensor signal to a control signal, and transmitting the control signal to the appliance to thereby effect control of the appliance. In some embodiments, the appliance control unit receives the sensor signal by way of a receiver, which can be a wireless receiver. In some embodiments, the appliance comprises the appliance control unit and in other embodiments, the appliance control unit is separate from the appliance. In some embodiments, the appliance control unit is a smart device (e.g., a personal digital assistant, a mobile phone or a personal computer).

In some embodiments of the presently disclosed subject matter, a method for remote control of an appliance by a subject is provided. In some embodiments, the method comprises providing in the mouth of a subject a tracer unit non-obstructively affixed to the tongue such that a change in position of the tongue changes position of the tracer unit; detecting the position of the tracer unit; generating a sensor signal based on the detected position of the tracer unit; and transmitting the sensor signal to an appliance, wherein the sensor signal effects control of the appliance. In some embodiments, an assistive apparatus disclosed herein is utilized for remote control of the appliance.

In some embodiments of the presently disclosed subject matter, a method for tracking movement, position, or both of a tongue in a subject is provided. In some embodiments, the method comprises providing in the mouth of a subject a tracer unit non-obstructively affixed to the tongue such that a change in position of the tongue changes position of the tracer; detecting the position of the tracer unit; generating a signal based on the detected position of the tracer unit; and analyzing the signal to thereby track movement, position, or both of the tongue. In some embodiments, the method comprises transmitting the signal to a computer, wherein the computer analyzes the signal. In some embodiments, the method comprises repeating each of the steps of the method a desired number of times to track tongue movement, position, or both over a time period to generate a tongue movement pattern. Further, in some embodiments, the method comprises comparing the tongue movement pattern to a standard tongue movement pattern as part of a speech analysis program, a speech therapy program, or both. In some embodiments of the method, an assistive apparatus disclosed herein is utilized for tracking movement, position, or both of the tongue.

Accordingly, it is an object of the presently disclosed subject matter to provide an apparatus for tongue-operated sensor-based remote control of an appliance. This object is achieved in whole or in part by the presently disclosed subject matter.

An object of the presently disclosed subject matter having been stated above, other objects and advantages will become apparent to those of ordinary skill in the art after a study of the following description of the presently disclosed subject matter and non-limiting examples.

BRIEF DESCRIPTION OF THE DRAWINGS

FIG. 4 is a perspective view of an exemplary sensor useful in the present assistive apparatus, with dimensions and circuitry noted in the insert.

FIGS. 5A and 5B are graphs in a series and including schematic drawings showing how lateral and distal movements of a magnet tracer unit with respect to the surface of a Hall-effect sensor change the magnetic flux density and result in variations in the sensor output voltage.

DETAILED DESCRIPTION

Figure 1:
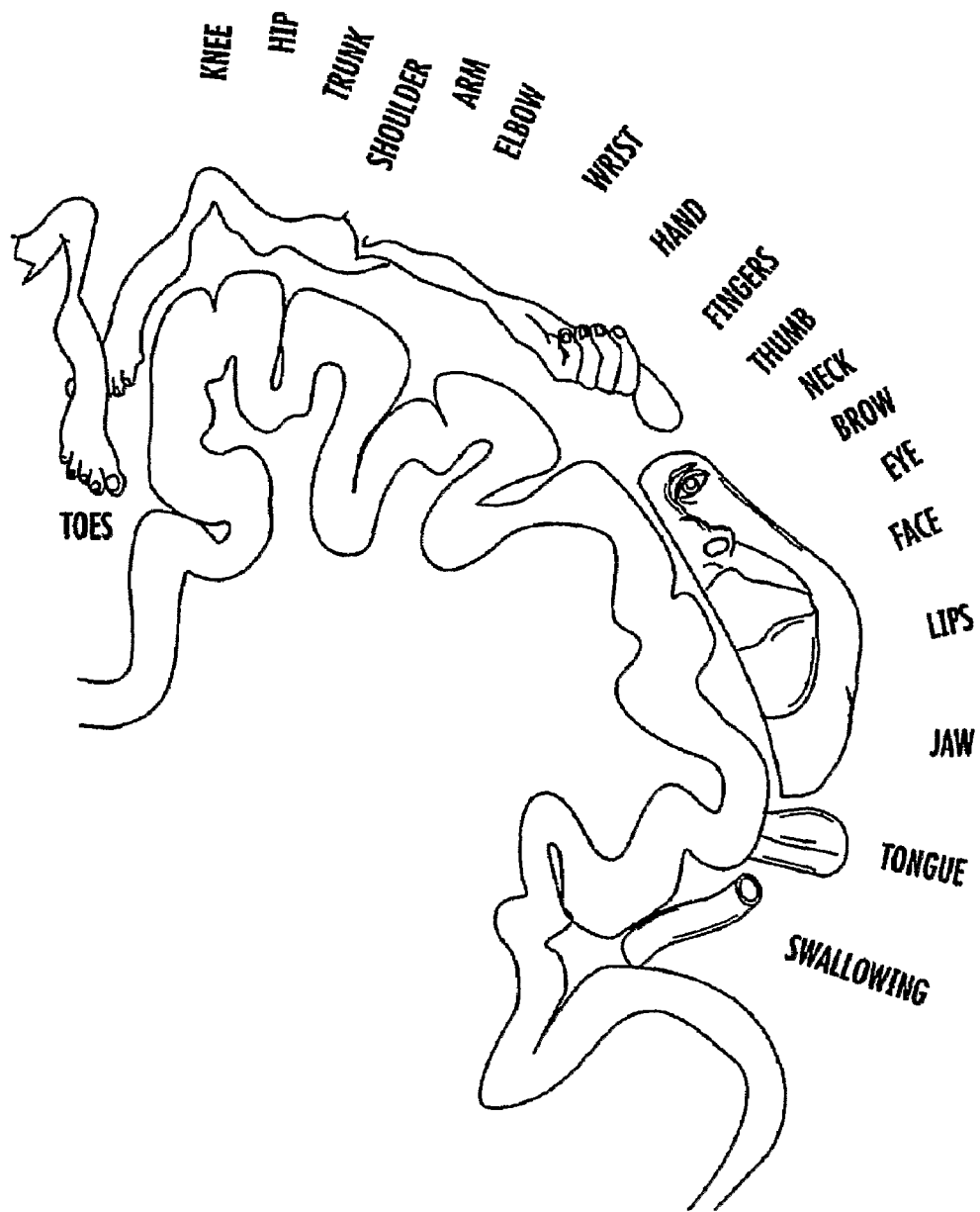
FIG. 1 is a motor homunculus drawing showing the proportional amount of brain motor cortex devoted to control of mouth, tongue, and other parts of the body.

The presently disclosed subject matter provides an oral, tongue controlled assistive apparatus for control of the environment by a subject. Methods for using the apparatus for control of the environment and for tracking tongue movement, position, and/or orientation are further provided. The tongue is considered an excellent appendage for operating an assistive technology apparatus, particularly with regard to severely disable individuals, such as for example quadriplegics, who have very little or no limb control. Additionally, the assistive apparatus can be useful for subjects involved in complex manipulations of the environment requiring full engagement of the limbs, such as for example pilots, soldiers, astronauts, and scuba divers, who can benefit from assistive technology to provide additional control of the environment. The assistive apparatus can also help the crew of agile combat aircrafts to control the plane or communicate with the command center under high gravity (high-G) physical stress, when effective limb functions or even speech is hindered. Further, the assistive apparatus can be of assistance to subjects who have a need to track and measure tongue movements and positioning, such as for example in subjects engaging in speech therapy, wherein there is a need to know tongue positioning during speech to aid in diagnosis and treatment of speech pathologies. In addition the assistive apparatus can help people who are unable to talk, as a result of tracheotomy, apraxia of speech, or ALS. The ability to make a few specific movements with their tongue can be interpreted by the apparatus software as specific words. These selected words can then be generated by a speech synthesizer. Currently these individuals, who might also be severely disabled, need to type what they want to say.

The apparatus can comprise a tracer unit that can be nonobstructively affixed to the tongue of the subject and at least one sensor, and in some embodiments an array of sensors, that can be positioned proximal to the tongue and tracer unit. "Non-obstructive" affixation of the tracer unit, as well as other components of the apparatus including but not limited to the at least one sensor, refers to placement of the component within or proximal to the mouth such that it does not substantially interfere with normal activities of the mouth, including but not limited to eating and speaking. "Non-obstructive" affixation or placement can also (but not necessarily) refer to affixation or placement of a component in a cosmetically acceptable (e.g., concealed) manner.

The sensor(s) measures the location, orientation, and/or changes in location of the tracer unit, which moves according to positioning of the tongue. "Proximal", with reference to the positioning of the sensor, refers to a distance sufficiently close to the tracer unit to detect a position (e.g., location, orientation, and/or change in position and/or orientation) of the tracer unit, such as for example outside of the mouth affixed on or near the face or within the mouth attached, for example on the outside of the teeth so as to be non-obstructive. Thus, proximal positioning of the sensor(s) depends on the sensitivity of the sensors as well as the detectability of the tracer unit and is within the capabilities of one of skill in the art to determine without undue experimentation. The sensor processes the tracer unit positioning into sensor signals, which can be digitized and transmitted to an external appliance control unit, such as for example a "smart device" (e.g., a personal digital assistant (PDA)), which then effects control of a desired appliance. In some embodiments, the smart device is a wireless smart device for wireless communication with the sensors and/or appliances controlled.

Thus, the sensor data related to tracer unit positioning is processed and combined to determine the position and motion of the tongue relative to the sensors. This information is then used to effect control of an appliance. Therefore, movement of the tongue while utilizing the assistive device can be used to operate, for example, a wheelchair, a computer, a phone, home appliances or other equipment. In one embodiment of the presently disclosed subject matter, the apparatus comprises a wireless integrated mouthpiece, powered by a small battery, transmitting tongue location data based on positioning of a tracer unit affixed to the tongue to a compact portable appliance control unit, such as a wireless smart device (e.g., a pocket computer, a personal digital assistant, or a mobile phone). The appliance control unit can then connect the subject to appliances and/or local and global environments through, for example a wireless local area network (WLAN) and the Internet, respectively.

One advantage of the presently disclosed apparatus is that one or a few sensors can capture a large variety of tongue movements by processing individual or a combination of sensor outputs. A set of specific movements can be tailored for each individual user and mapped onto a set of customized functions for environment control. Further, the presently disclosed apparatus can provide the advantage of proportional control of the environment, which allows for a smoother and more natural control over the environment compared to other devices that are mostly based on on/off switches or a limited number of states. Fewer sensors translate to an unobtrusive device with lower power requirements. Moreover, the sensors can be activated by a passive tracer component in the form of a permanent magnet leading to additional power savings. Another advantage over alternative technologies is that the system is largely immune to noise, interference, and involuntary body movements that might affect normal operation.

I. General Considerations

As shown in FIG. 1, a motor homunculus illustrates that the tongue and the mouth occupy an amount of sensory and motor cortex that rivals that of the fingers and the hand. Unlike the eyes, which have rich cortical representations but have been evolved as sensory organs, the mouth and the tongue have evolved as motor and manipulation organs. Thus, they are inherently capable of performing sophisticated motor control and manipulation tasks, which are evident in their usefulness in vocalization and ingestion (Kandel et al., 2000; Salem & Zhai, 1997).

The tongue is connected to the brain by a cranial nerve (the hypoglossal nerve), which generally escapes severe damage in spinal cord injuries. It is also one of the last appendages to be affected in most neuromuscular degenerative disorders. These observations along with the fact that the tongue can move very fast and accurately within the mouth cavity with many degrees of freedom, point to great potentials of using the tongue as an organ for manipulating assistive devices. Furthermore, the tongue muscle is similar to the heart muscle in that it does not fatigue easily. The tongue muscle is not afflicted by repetitive motion disorders that can arise when a few exoskeletal muscles and tendons are regularly used. Therefore, unlike head pointing and related technologies requiring motion of other body parts, a tongue operated device can have a very low rate of perceived exertion and can be used over a long period of time (Lau & O'Leary, 1993; Cook & Hussey, 2001).

Unlike EOG or EMG based systems that require attachment of surface electrodes to the user's face, an oral device involving the tongue is mostly hidden from sight. Thus, it is cosmetically inconspicuous and offers a degree of privacy for the user. The tongue is not influenced by the posture and position of the rest of the body. Therefore, unlike many other assistive devices, which lock the patient in front of a computer monitor or in a wheelchair to be able to use the device, an oral device involving the tongue can be used in any position or posture, especially for example if it is wireless. The tongue can function during random or involuntary neurological activities such as muscular spasms. Therefore, tongue-operated assistive devices are less prone to involuntary movements, which can affect other devices, especially those based on EMG, EEG, or EOG signals. Tongue movements are very natural and do not require as much thinking or concentration. Therefore, tongue-operated assistive devices potentially can be easy to learn and use. When a disabled individual uses a computer, which is one application of assistive and environment control technologies, the individual directly uses his/her eyes and brain at all times. However, it is less likely for the individual to require use of their tongue, for example by talking or eating at the same time. Therefore, using the tongue in an assistive device can require minimum effort and cause minimum interference with other activities that an individual is involved in when using an oral assistive device. Furthermore, unlike neural signals from the motor cortex, noninvasive access to tongue movements is readily available.

A few tongue-operated assistive technologies have been developed to date. However, despite all the advantages noted above, these devices have not been widely used by disabled individuals for several reasons. For example, TONGUE TOUCH KEYPAD™ (TTK; NewAbilities Systems Inc., Santa Clara, Calif., U.S.A.) includes a keypad fitted in the roof of the mouth with nine sensors that are activated by the touch of the user's tongue. The sensors emit radio waves to a control box mounted on the person's wheelchair, bed, or other furniture, which operates a computer or other equipment in the environment. The TTK system is limited as being switch-based (rather than continuous proportional control), bulky, and obtrusive. It cannot offer proportional control or large degrees of freedom. TONGUE POINT™ (International Business Machines, Armonk, N.Y. U.S.A.) is based on the IBM TRACKPOINT® pointing device, which is a pressure sensitive small isometric joystick for use inside the mouth (Salem & Zhai, 1997). Although this device provides proportional control, it is restricted to a joystick operation and any selection or button click operation is performed through an additional external switch or a bite switch. The tip of the joystick also protrudes about 1 cm into the mouth, which could interfere with user's talking and eating functions. This device can also prove to be uncomfortable for long-term use. The TONGUE-MOUSE™ has a sensor module incorporating piezoelectric ceramic sensors and conductive adhesives to connect the sensors to the electronics (Nutt et al., 1998). The sensors form a matrix, the elements of which can detect strength and position of touch by the tongue. The sensor module is fitted within the oral cavity as a conventional dental plate and the user should hold the plate between his/her front teeth. However, the sensor module plate is rather large and prevents the user from eating or talking while using this device.

The presently disclosed assistive apparatus also involves the tongue as the controlling appendage. However, the presently disclosed apparatus addresses deficiencies of other oral assistive devices in that it can have one or more of the following characteristics: small, unobtrusive, low cost, non- or minimally invasive, and/or cosmetically acceptable for the subject using the device. In particular, the present apparatus provides for tracing the motion of the tongue by sensors positioned proximal to the tongue using a tracer unit affixed to the tongue. The detected tongue motion can then be converted to control signals for controlling appliances within the subject's environment.

II. Definitions

"Appliance", as used herein, refers to an instrument or device designed for a particular or general use or function. An appliance can be, but is not limited to a personal computer, a wheelchair, a bed, a telephone, a home appliance, and a speech synthesizer.

"Magnetic field strength" (H, Units: Oersted) (also known as magnetizing or demagnetizing force), refers to the measure of the vector magnetic quantity that determines the ability of an electric current, or a magnetic body, to induce a magnetic field at a given point.

"Magnetic induction" (B, Units: Gauss) refers to the magnetic field induced by a field strength, H, at a given point. It is the vector sum (at each point within the substance) of the magnetic field strength and resultant intrinsic induction. Magnetic induction is the flux per unit area normal to the direction of the magnetic path.

"Hysteresis loop" refers to a closed curve obtained for a material by plotting (usually in rectangular coordinates) corresponding values of magnetic induction, B, for ordinate and magnetizing force, H, for abscissa when the material is passing through a complete cycle between definite limits of either magnetizing force, H, or magnetic induction, B.

A "demagnetization curve" is the second (or fourth) quadrant of a major hysteresis loop. Points on this curve are designated by the coordinates $B_d$ (remnant induction) and $H_d$ (remnant field).

"Remnant induction" ($B_d$, Units: Gauss) refers to any magnetic induction 10 that remains in a magnetic material after removal of an applied saturating magnetic field, $H_s$. ($B_d$ is the magnetic induction at any point on the demagnetization curve).

"Remnant field" ($H_d$, Units: Oersteds) refers to the value of H corresponding to the remnant induction, $B_d$ on the demagnetization curve.

"Energy product" ($B_d H_d$, Units: Megagauss-Oersteds (MGOe)) refers to the energy that a magnetic material can supply to an external magnetic circuit when operating at any point on its demagnetization curve.

As used herein, "remote control", as in the "remote control of an appliance", refers to control of an object indirectly by way of an intermediary without direct control by the actor on the object. For example, "remote control" can encompass the control of an appliance by a subject via an assistive apparatus disclosed herein, wherein tongue movements and positioning are translated to command signals by the apparatus and issued to the appliance. "Remote control" is inclusive of both wired and wireless communication between the actor, the intermediary, and/or the object controlled.

As used herein, the term "smart device" refers to a device with processing capabilities. A smart device can have onboard memory or other storage capacity, can be written to as well as read from, and can contain one or more applications that perform a particular function. Some smart devices can contain an operating system. Exemplary smart devices include, but are not limited to personal computers, PDAs and mobile telephones. Some smart devices communicate wirelessly and can be referred to herein as wireless smart devices.

As used herein, the term "wireless smart device" refers to a smart device which can communicate via an electric and/or magnetic field between the smart device and some other entity, such as for example an appliance and/or a sensor control unit. One type of wireless communications that can be used between a wireless smart device and reader is near field communications. Near field communications typically occur at a distance of within about one wavelength of the communications frequency being used between the wireless smart device and the receiving and/or communicating unit. A wireless smart device can communicate with a device via inductive coupling of the other device antenna to the smart device antenna. The two loop antennas effectively form a transformer. The reader amplitude-modulates the RF field to send information between the devices. The smart device communicates with other devices, including other smart devices, by modulating the loading on the smart device antenna, which also modulates the load on the other device antenna. Longer range wireless communication techniques for use by wireless devices which include, but are not limited to, BLUETOOTH®, optical, and infrared, can also be used.

III. Assistive Apparatus

The presently disclosed subject matter provides an assistive apparatus for remote control of an appliance by a subject. In some embodiments, the subject can be a human subject in need of an assistive device for manipulating their environment, such as disabled individuals, including for example quadriplegic subjects and those with other spinal cord injuries (SPI). In some 25 embodiments, the subject is in need of controlling a complex appliance, or is functioning in a difficult environment and can utilize the assistive device to control the appliance or function in the environment. For example, the subject in some embodiments can be a pilot, astronaut, scuba diver, or soldier.

In some embodiments, the assistive apparatus comprises: (a) a tracer unit that can be non-obstructively affixed to the tongue of the subject such that a change in position of the tongue changes position of the tracer unit; and (b) at least one sensor for detecting a position of the tracer unit and adapted for non-obstructive placement proximal the tracer unit. The apparatus can further comprise a sensor control unit for transmitting a sensor signal from the sensor(s) to the appliance or appliances to be controlled based on the detected position of the tracer unit to thereby control the appliance. In some embodiments, the sensor control unit processes the sensor signals and transmits them directly to the appliance as control signals to effect control of the appliance. In other embodiments, the apparatus can comprise an appliance control unit that can be physically separated from, but in communication with, the sensor control unit. In these embodiments, the appliance control unit receives the sensor signals and processes the sensor signals to control signals, which are then transmitted to the appliance to effect control of the appliance. In some embodiments, the appliance control unit can be integrated into the appliance. In other embodiments, the appliance control unit is a separate device in communication with the appliance.

The signals received from the sensor control unit by the appliance control unit can be demodulated and demultiplexed to extract the individual sensor outputs. By processing these outputs, the motion of the tracer unit and consequently the tongue within the oral cavity is determined. Assigning a certain control function to each particular tongue movement can be done in software and can be customized for each individual user. These customized control functions can then be used to control (e.g., operate) the appliance or appliances.

In some embodiments of the assistive apparatus, the tracer unit comprises a magnet and the motion of the tongue is traced by an array of magnetic sensors, which measure the magnetic field generated by the magnet. The tracer unit can comprise a magnet contained within a nonmagnetic fixture and affixed to the tongue. The magnetic sensors can be positioned proximal the tracer unit, and in some embodiments can be mounted on a dental retainer and attached on the outside of the teeth to measure the magnetic field from different angles and provide continuous real-time analog outputs. In other embodiments, the sensors are positioned outside the mouth, but in close proximity to the magnetic tracer unit, such as for example affixed on support structures attached to the head of the subject (e.g., similar to headphones) that position the one or more sensors at desired locations near the tracer unit (e.g., on or near left and/or right cheeks of the subject). The maximum distance for proximal placement of the magnetic sensors relative to the tracer unit is dependent upon both the strength of the magnet and the sensitivity of the magnetic sensors, as is readily determinable by one of skill in the art. For example, a larger magnet can generate a larger magnetic field and will permit for further distance from the magnet to achieve proximal placement of the magnetic sensor. However, at some point the magnet size may become too large to be non-obstructively affixed to the tongue as a tracer unit. Likewise, a sensor can be chosen based on increased sensitivity if a further proximal placement distance is desired. Depending on the sensitivity of the sensor and the magnetic field strength of the magnet, in some embodiments, proximal placement of the sensor with reference to the tracer unit can be less than about 20 cm, in some embodiments less than about 15 cm, in some embodiments less than about 10 cm, in some embodiments less than about 5 cm, and in some embodiments less than about 2 cm.

The signals from the magnetic sensors can be linear functions of the magnetic field, which can be a continuous position-dependent property, and which can provide for continuous proportional control of an appliance. Thus, a few magnetic sensors are able to capture an unlimited number of tongue positions and movements (Schlager et al., 2001). These sensors can provide a tremendous advantage over switch-based (digital) on/off devices in that the user can communicate with the environment much faster, smoother, and more naturally using options of proportional, fuzzy, and/or adaptive control over the environment. In real life, control of the environment occurs via an analog regime. Thus, a few representative sensors utilized by the present apparatus are able to capture a wide variety of tongue movements, which provides advantages over switch-based devices. For example, other assistive technologies that emulate a computer mouse use an additional input device such as a switch for the mouse button clicks besides the primary method for moving the pointer. In the presently disclosed subject matter on the other hand, the additional switches are unnecessary since a specific tongue movement can be assigned to the button press.

Figure 2:
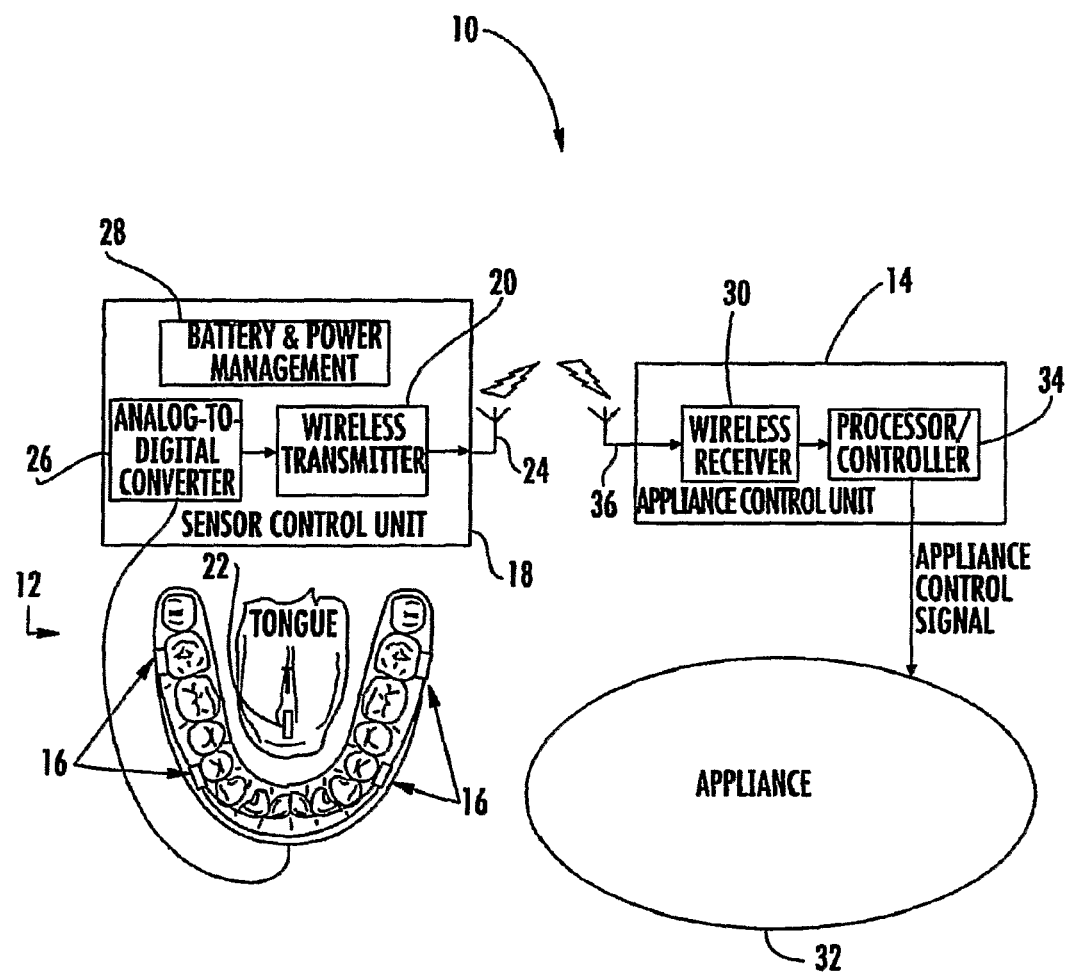
FIG. 2 is a schematic drawing of an assistive apparatus disclosed herein showing interaction of the various components with each other and an appliance to be controlled.
Figure 3A:
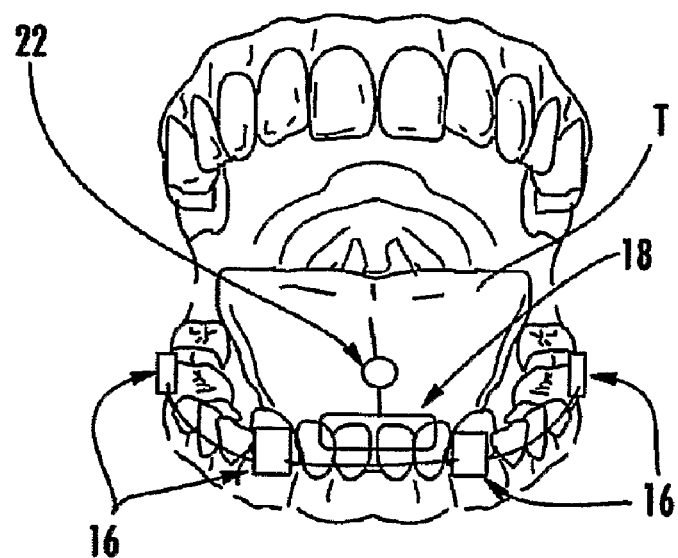
FIGS. 3A and 3B are front views and side perspective views of a model of a mouth showing exemplary placement of a tracer unit, sensors and sensor control unit within the mouth.
Figure 3B:
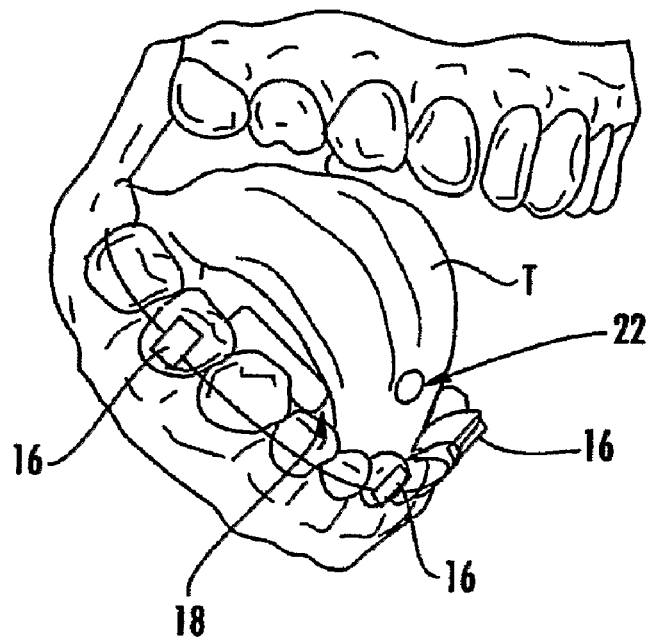

FIG. 2 is a schematic diagram showing one embodiment of an assistive apparatus 10 disclosed herein comprising two components: one inside the mouth, a mouthpiece 12, and the other outside the mouth, an appliance control unit 14, which can in some embodiments be portable. Mouthpiece 12 can include sensors 16 and a sensor control unit 18. The mouthpiece 12 electronics can be integrated on an application specific integrated circuit (ASIC). The sensorcontrol unit 18 comprising the ASIC along with a wireless transmitter 20 can be incorporated into a miniaturized package that can be fitted under the tongue as part of a dental retainer, as shown in FIGS. 3A and 3B. A tracer unit 22, such as for example a magnet, can be coated with a non-magnetic biocompatible material such as gold, platinum, or a polymer and affixed to the tongue T. Due to the proximity of tracer unit 22 and sensors 16 in the oral cavity, apparatus 10 can be more robust with regard to noise, interference, and involuntary movements compared to alternative technologies. Many aspects of the apparatus can be customized and fine tuned through software for a particular individual's oral anatomy, requirements, and disabilities. Therefore, apparatus 10 can serve as a platform to address a variety of needs of different individuals.

As noted, apparatus 10 can comprise mouthpiece unit 12, which can be located inside the oral cavity, as shown for example in FIGS. 3A and 3B, and an external appliance control unit 14 that can be located within the subject's surrounding environment and which is in communication, for example by wired or wireless communication, with mouthpiece 12. With reference to FIG. 2, mouthpiece 12 and appliance control unit 14 can comprise the following components.

The components that can be positioned within the mouth include tracer unit 22 and mouthpiece 12. Mouthpiece 12 can comprise sensors 16 arranged in a coordinated array within the mouth; wireless transmitter 20, which can comprise a miniature antenna 24; an analog to digital converter (ADC); and power management circuitry 28, which can include a battery.

Tracer unit 22 can in some embodiments comprise a magnet, which can be contained within a biocompatible non-ferromagnetic fixture (e.g., gold, platinum, a polymeric material, or combinations thereof) that is non-obstructively affixed to tongue T, as shown in FIGS. 2, 3A, and 3B. "Affixed to the tongue" as used herein means secured to the tongue such that tracer unit 22 is not easily dislodged from the tongue and tracks tongue movement accurately. That is, tracer unit 22 is secured tightly enough to tongue T such that fine movements of tongue T are not lost to sensors 16 due to wobble or other unnecessary motion of tracer unit 22. For example, tracer unit 22 can be mounted on a post that is pierced through the tongue or tracer unit 22 can be embedded within the tongue. Instead of pierced or implanted tracer units 22, a subject can have small tracer units 22 attached to their tongue T by small plastic clips or with elastic bands. It is also possible to temporarily attach the tracer to the subject's tongue using a waterproof biocompatible tissue adhesive such as Dermabond® (Johnson & Johnson, New Brunswick, N.J., U.S.A.).

The magnet can in some embodiments be a permanent magnet exhibiting straight-line normal demagnetization curve properties. The magnet generates a magnetic field inside the mouth and outside proximal to the face that changes with tongue movements, and provides real time information about the tongue position and orientation (i.e. direction) with respect to the jaw coordinates (sensor 16 locations). A permanent magnet that generates the magnetic field can be a small, passive, and inherently wireless component leading to user convenience and requiring no power source. That is, sensors 16 can be magnetic sensors and can be activated by a permanent magnet. The system power requirement is thus limited to the sensors and the wireless link over a short range (e.g., 2 meters), which can be designed to be low power by time-division-multiplexing (TDM), i.e. turning only one sensor on at any particular time, and other circuit design techniques, as disclosed herein. Therefore, the battery size can be small and its lifetime sufficiently long to reduce burden on the subject.

In some embodiments, the magnet can be a flexible magnet, a rare earth magnet or a ceramic magnet. Exemplary rare earth magnets useful for incorporation within tracer unit 22 include but are not limited to neodymium-iron-boron (NdFeB) magnets and samarium-cobalt magnets (SmCo). Table 1 lists properties of several exemplary magnets suitable for use with the presently disclosed subject matter.

TABLE 1

Characteristics of Materials Used in Permanent Magnets

| Material | $B_r$ (Gauss) | $H_C$ (Oersteds) | $BH_{max}$ (MGOe) |
| --- | --- | --- | --- |
| Flexible | 1,725 | 1,325 | 0.6 |
| Ceramic 1 | 2,200 | 1,900 | 1.1 |
| Ceramic 5 | 3,950 | 2,400 | 3.6 |
| SmCo 18 | 8,600 | 7,200 | 18 |
| SmCo 26 | 10,500 | 9,200 | 26 |
| NdFeB 35 | 12,300 | 11,300 | 35 |
| NdFeB 41 | 13,050 | 12,500 | 41 |

Continuing with reference to FIG. 2, sensor 16 can in some embodiments comprise an array of sensors. In some embodiments, sensors 16 are magnetic sensors, such as for example Hall-effect sensors, magnetoinductive sensors (e.g., MICROMAG2™ from PNI Corporation, Santa Rosa, Calif., U.S.A.) and/or magnetoresistive sensors (e.g., serial numbers HMC1501, HMC1512, and HMC6052 available from Honeywell International, Inc., Plymouth, Minn., U.S.A.) when tracer unit 22 comprises a magnet. Magnetic sensors, which are available in sizes as small as 3×2×0.75 mm$^3$ (see FIG. 4 illustrating Allegro A1391 (Allegro Microsystems, Inc., Worcester, Mass., U.S.A.) micropower 3 V linear Hall-effect sensor with tri-state output and user selectability), can be incorporated in a dental fixture and mounted on posts attached to the outside of the upper or lower teeth in the form of an orthodontic brace. Alternatively, soft form-fitting plastic dental fixtures can be used to conform to each subject's oral anatomy, while holding the sensors. Sensors 16 can be stationary with respect to the jaw coordinates and gather information about movements and orientation of the permanent magnet that is attached to the tongue as tracer unit 22. Sensors 16 convert the magnetic field intensity (B) from the magnet to a proportional analog output voltage. For example, linear Hall-effect sensors convert the magnetic flux density that is vertical to their surface to a proportional voltage, which can be measured as a continuous real-time analog signal output. Therefore, they respond to lateral, distal, and rotational movements of a magnetic tracer unit 22, as depicted in FIGS. 5A and 5B.

Power management circuitry 28 can be linked with a battery and provide for control of power distribution to sensors 16. A small battery such as a button cell can provide sufficient power to mouthpiece 12 components for a long duration, for example up to several weeks. Power management circuitry 28 scans through sensors 16 at a predefined rate and turns them on one at a time to save power. Thus only one sensor 16 draws power at any certain time in order to reduce power consumption.

Sensor control unit 18 can process sensor signals from an analog signal to a digital signal. For example, sensor control unit 18 can include an analog to digital converter (ADC) 26, which can be equipped with a multiplexer that has as many input channels as the number of magnetic sensors 16 in the array, and can take one or multiple samples from the analog output of sensor 16, which is turned on by power management circuitry 28. This results in a time division multiplexed (TDM) series of samples, which are then converted to a serial data bit stream by ADC 26 before being transmitted across, for example a wired or wireless link to appliance control unit 14, as shown in FIG. 2. In one embodiment of the presently disclosed subject matter, the serial data bit stream is stored in an intermediate temporary first-in-first-out (FIFO) buffer to be transmitted at a high rate when the buffer is full. The communication link (e.g., via wireless transmitter 20 and antenna 24) can be faster than the sampling rate required for this application. Therefore, the intermediate buffer can result in power saving by reducing the duty cycle of transmitter 20.

Continuing with reference to FIG. 2, a transmitter unit such as wireless transmitter 20, can be incorporated into sensor control unit 18 along with the digitization blocks (e.g., ADC 26) and power management blocks (e.g., power management circuitry 28), and modulates the buffered serial data into a wireless signal, such as for example an RF signal and transmits it to an external receiver. In one embodiment of the present invention, the transmitter operates in the industrial-scientific-medical (ISM) band.

Continuing with reference to FIG. 2, a wireless transmitter 20 comprises antenna 24, which can be designed for the transmitter specific operating frequency (carrier frequency). Antenna 24, which improves the range of the transmitted signal, can also be incorporated into sensor control unit 18, along with wireless transmitter 20, ADC 26, and power management circuitry 28. Sensor control unit 18 can be mechanically supported by a dental fixture and electrically connected to sensors 16, as shown in FIG. 2. In an embodiment shown in FIGS. 3A and 3B, sensor control unit 18 is shown located under tongue T such that it does not interfere with the biological tongue functions in speech and food ingestion.

Appliance control unit 14 can receive a sensor signal from sensor control unit 18 by way of a receiver, which can be in some embodiments and as shown in FIG. 2, a wireless receiver 30. Wireless receiver 30 can detect, demodulate, demultiplex, and decode different channels of the sensor control unit 18 outputs. In some embodiments, sensor control unit 18 can process the sensor signal to a command signal for communication to an appliance 32, either directly or by way of appliance control unit 14. In other embodiments, and as shown in FIG. 2, appliance control unit 14 can comprise a processor/controller unit 34 that translates the sensor signal to a control signal and then transmits the control signal to appliance 32 to effect control of appliance 32. In particular, processor/controller unit 34 processes the sensor outputs to determine the motion of the tongue and translates the motion to a digital or analog command for control of appliance 32.

Continuing with reference to FIG. 2, in one embodiment of the presently disclosed subject matter, wireless receiver 30 and its antenna 36 can be incorporated as an integral component of appliance control unit 14. Appliance control unit 14 can be a commercially-available device modified to function as intended with the presently disclosed subject matter. Exemplary devices can include or be a mobile phone, a smartphone, a PDA, a computer, and a media player. A media player can include or be any device suitable for displaying images, and/or playing sounds and/or video. Appliance control unit 14 can include a processor, memory, an input interface, and/or an output interface. The appliance control unit can also provide the subject (user) with visual or audio feedback related to the menu being selected or the function being performed. The appliance control unit can include a graphical user interface, which displays the results of the subject's selections and the current status of the assistive apparatus.

Figure 6:
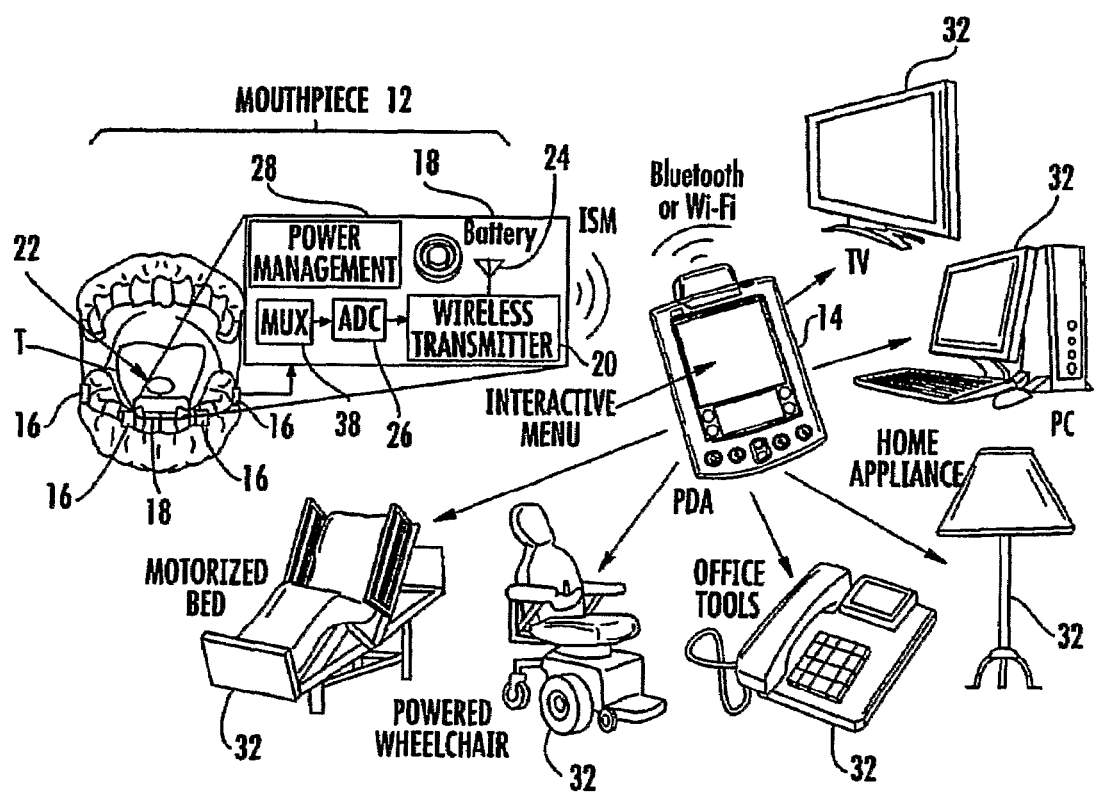
FIG. 6 is a schematic drawing of an assistive apparatus disclosed herein showing interaction of the various components with each other and an appliance to be controlled.

FIG. 6 schematically depicts a particular embodiment of assistive apparatus 10 disclosed herein, with specific components and functioning to interact with multiple appliances 32. Tracer unit 22 comprises a magnet and is affixed to tongue T. Sensor control unit 18 comprises power management circuitry 28, which distributes battery power between sensors 16 and other circuit blocks. Power management circuitry 28 scans through magnetic sensors 16 at a rate well above the speed of tongue T movements (e.g., ~100 Hz) and turns them on, one at a time, in order to save power and increase the battery life. Analog sensor outputs are then time division multiplexed (TDM) onto a single analog line by a multiplexer (MUX) 38, digitized by ADC 26, modulated, and transmitted to the external part of the system, appliance control unit 14, which in FIG. 6 is shown as a PDA, across a wireless link between wireless transmitter 20 and wireless receiver 30 in the industrial-scientific-medical (ISM) band, for example. The PDA used for this embodiment as appliance control unit 14 can be equipped with an ISM-band receiver, which is commercially available.

Continuing with reference to FIG. 6, appliance control unit 14 can be located close to the subject, for example worn by the subject on a belt or attached to a wheelchair. As a result, sensor control unit 18 power can be very small as the transmission range does not need to exceed approximately 2-3 m, for example. The signals received by the PDA can be demodulated and demultiplexed to reconstruct the individual sensor outputs. The PDA can either process the sensor signals by itself or wirelessly transmit them to a PC 40 that is within the user's environment via BLUETOOTH® or Wi-Fi, for example. By processing the sensor signals, which are proportional to the intensity of the magnetic field perpendicular to the surface of every sensor 16, the real-time position and orientation of the permanent magnet within tracer unit 22 with respect to the sensor array constellation, and consequently the tongue within the oral cavity can be determined (Schlager et al., 2001; Schott et al., 2002).

The software running on appliance control unit 14 (PDA in FIG. 6) or a computer connects these real-time position/orientation dots (vectors) and extracts a trajectory of tongue T movement. The software can then translate the tongue T movements into cursor movements on the PDA or PC screen, similar to a mouse pointer. They can also be translated to any other function such as left-click, right-click, and double-click, in a mouse, or proportional left, right, up, down, and pressing of a button in a joystick, or to control other appliances (e.g., on/off for a light or change in motion or position for a motorized bed or a powered wheelchair). It is also possible to assign a specific tongue movement to temporarily disable assistive apparatus 10 (e.g., standby mode) when the subject wants to talk, eat, sleep, etc. and re-enable it by another dedicated tongue movement.

By assigning certain control functions to particular tongue movements in the software, it is possible to customize assistive apparatus 10 for each individual user based on his/her oral anatomy, lifestyle, and disabilities. These customized control functions, which can also be adaptive over time, can then be used to operate a variety of appliances 32 including phones, home appliances, office tools, powered wheelchairs, and/or motorized beds either directly from the PDA or indirectly through the PC, as shown in FIG. 6.

IV. Methods for Remote Control of an Appliance

The presently disclosed subject matter further provides methods for remote control of an appliance by a subject. In some embodiments, the method comprises providing in the mouth of a subject a tracer unit such that a change in position and/or orientation of the tongue changes position or orientation of the tracer; changing a position (and/or orientation) of the tracer unit by moving the tongue, which can change the field generated around the tracer unit, for example, when the tracer unit comprises a magnet; detecting the position of the tracer unit; generating a sensor signal based on the position of the tracer unit; and transmitting the sensor signal to an appliance control unit or directly to an appliance, wherein the sensor signal effects control of the appliance. In some embodiments, the position of the tracer unit can be detected after processing the sensor signal. In some embodiments, the tracer unit comprises a magnet, as disclosed herein.

In some embodiments, an assistive apparatus disclosed herein is utilized for remote control of the appliance The apparatus can comprise in some embodiments the tracer unit non-obstructively affixed to the tongue, at least one sensor for detecting the position of the tracer unit and adapted for non-obstructive placement proximal the trace unit, and a sensor control unit for transmitting the sensor signal to the appliance based on the detected position of the tracer unit. In some embodiments, the at least one sensor comprises an array of sensors and the apparatus further comprises power management circuitry for controlling power distribution to the plurality of sensors. In some embodiments, the appliance is selected from the group consisting of a personal computer, a wheelchair, a bed, a telephone, a home appliance, and a speech synthesizer.

In some embodiments, the apparatus comprises an appliance control unit for receiving the sensor signal from the sensor control unit, translating the sensor signal to a control signal, and transmitting the control signal to the appliance to thereby effect control of the appliance. In some embodiments, the appliance control unit is a smart device, such as for example a personal digital assistant, a mobile phone or a personal computer.

In some embodiments, the subject is partially or completely disabled, such as for example a quadriplegic subject and the apparatus provides for control of appliances that facilitate control of a disabled subject's environment so that the subject can be at least partially self-sufficient. For example, in some embodiments the appliance is a personal computer, a wheelchair, a bed, a telephone, a home appliance, and/or a speech synthesizer.

Besides allowing for control of appliances by a disabled subject, the presently disclosed assistive apparatus can facilitate communication with others by the subject either via typed text on a computer or, for example, by augmentative and alternative Communication (AAC) systems. Thus, once a disabled subject becomes capable of effectively using a computer by way of the assistive apparatus disclosed herein, the subject can easily benefit from a wide range of other computer-based AAC devices and software that have already been developed for people with various types of disabilities. For example, the assistive apparatus can facilitate speech generation, which can provide tremendous benefit to subjects who are unable to talk, as a result of tracheotomy, apraxia of speech, or Amyotrophic-Lateral Sclerosis (ALS). The ability to make a few specific movements with the tongue can be interpreted by the system software as specific words. These selected words can then be generated by a speech synthesizer that operates on the same computer. Currently these individuals, who might also be severely disabled, need to press several buttons and basically type what they want to say. By using the presently disclosed apparatus, they can not only type what they want in a much easier way, and can also dedicate an unlimited set of tongue movements to the various words that they use more often and therefore, after some training reach communication speeds comparable to naturally-speaking individuals.

In other embodiments, the subject is not disabled and the apparatus is used by the subject to manipulate complex appliances and/or function in difficult environments. For example, the subject can be an astronaut, a pilot, a scuba diver, or a soldier and the apparatus and methods disclosed herein are utilized to facilitate manipulation of the subject's environment.

For example, when astronauts leave their spaceship to enter the open space for space walks or when they land on another planet, they need to wear a heavy and thick space suit that severely limits their movements. Even though the gloves of the space suits allow some arm and finger movements, precise movements are difficult. There have also been reports of the suite mechanical joints being locked or worn off as a result of sand and dust entering the joints. Using an assistive apparatus disclosed herein, the astronauts can use their tongue as a "3rd arm" to control a device wirelessly without any mechanical movement through the suite joints. For example the astronauts can control robotic arms with their tongue. Also for long-term space missions, astronauts need to minimize their energy consumption, and therefore every movement counts. As such, if they can communicate with the spaceship computers using their tongue, they can be more efficient and consume less energy compared to moving their arms and fingers.

Similar limitations exist for scuba divers that need to perform specific tasks underwater. These individuals, especially when operating in deep water, also need to wear suits that limit movements of their arms and fingers. They can use their tongue along with an assistive apparatus disclosed herein to perform any specific function. In this case, however, the wireless magnetic sensor signals can be transferred to the external part of the system using sonar or optical links.

The assistive apparatus can also help the pilot and other crew of agile combat aircrafts to control the plane or communicate with the command center under high-G physical stress, when effective limb functions or even speech is hindered. By tracking the tongue position, the assistive device disclosed herein can be even used to indicate whether the pilot is conscious or not. Therefore the other crew or the central command can take on control of the aircraft.

Military personnel in stealth missions can also use an assistive device disclosed herein when any mechanical and apparent movement with their hands and arms can generate sound or vibrations that might reveal the location of the soldier or cause enemy reaction. In these cases, the soldier can perform any function such as talking to the central command unit or even triggering a weapon only by moving their tongue, which cannot be seen by the enemy.

V. Methods for Tracking Tongue Movement and/or Position

As noted herein, the presently disclosed assistive apparatus functions by tracking the location and trajectory of a tracer unit using one or more sensors. As such, the assistive apparatus measures the location and/or orientation of the tongue and the trajectories of the tongue movements inside the mouth cavity, which is an important factor in speech therapy and speech analysis. Those individuals with speech problems can easily wear the assistive apparatus temporarily in the form of a dental clip and a speech therapist can attach the magnet to a specific spot on their tongue with a small unobtrusive tongue clip or a biocompatible tissue adhesive (e.g., DERMA-BOND®, Johnson & Johnson), for example. As a result, the speech therapist can observe, analyze, and correct the 3-D tongue movements in real time while the patient pronounces different words.

Accordingly, in some embodiments the presently disclosed subject matter provides methods for tracking movement, position, or both of a tongue in a subject. In some embodiments, the method comprises providing in the mouth of a subject a tracer unit such that a change in position (and/or orientation) of the tongue changes position of the tracer; optionally changing a position of the tracer unit by moving the tongue; detecting the position of the tracer unit; generating a signal based on the detected position of the tracer unit; and analyzing the signal to thereby track movement, position, or both of the tongue. In some embodiments, the signal can be transmitted to a computer for analysis and determination of tongue movement and/or position, which can aid in speech analysis and/or therapy. In some embodiments, tongue movement, position, or both are tracked a desired number of times over a time period to generate a tongue movement pattern. The tongue movement pattern can then be compared to a standard tongue movement pattern as part of a speech analysis program, a speech therapy program, or both.

The apparatus utilized for the methods can in some embodiments comprise the tracer unit non-obstructively affixed to the tongue (e.g., temporarily with a clip or a biocompatible tissue adhesive), at least one sensor for detecting the position of the tracer unit and adapted for non-obstructive placement proximal the tracer unit, and a sensor control unit for transmitting the sensor signal to a computer for analysis based on the detected position of the tracer unit. In some embodiments, the at least one sensor comprises an array of sensors and the apparatus further comprises power management circuitry for controlling power distribution to the plurality of sensors, as disclosed herein.

EXAMPLES

The following Examples have been included to illustrate modes of the presently disclosed subject matter. In light of the present disclosure and the general level of skill in the art, those of skill will appreciate that the following Examples are intended to be exemplary only and that numerous changes, modifications, and alterations can be employed without departing from the scope of the presently disclosed subject matter.

Example 1

Wooden Apparatus Prototype

The first prototype system was developed to move a cursor on a PC screen based on the location of a tracer unit (a permanent magnet in this Example) relative to four Hall-effect magnetic sensors (Melexis, sensitivity >9 mV/G). The sensors were attached to wooden stands and placed at four cornets of a trapezoid. This configuration roughly resembles how the sensors can be located with respect to one another when positioned on the outer surface of the lower teeth. Two sensors controlled cursor movements along the x direction and the other two, movements along the y-direction. For initial testing the sensors were spaced ~4 cm apart. This distance was even larger than the required sensor spacing in the oral cavity, ensuring that the same technique can be used in a live subject setup. The sensor data was read into an NI-DAQ PCI-6023E data acquisition card available from National Instruments, Texas, U.S.A. Signal processing and graphical user interface (GUI) were developed in the LABVIEW® (National Instruments Corp., Austin Tex., U.S.A.) environment. A small disk shaped permanent magnet (RadioShack, Fort Worth, Tex., U.S.A.; model no. 64-1895, 1/8" rare earth magnet) was used as a tracer unit and mounted on a cardboard stand at the same height as the sensors and moved in the space between the sensors. Detailed specification of the permanent magnet and equations governing its magnetic field strength are discussed in Example 3 herein below.

The LABVIEW® code for this prototype system provides two modes of operation:

1. Proximity Detection: The cursor movement is controlled by the sensor closest to the permanent magnet, with a "deadzone" for the resting position of the magnet in which none of the sensors have control over the cursor. The proximity detection mode is similar to a switching (on/off) operating mode. For example, if the magnet is within a certain range of the front left sensor as set by a software threshold, the cursor moves to the left. In an improved version of the software, proportional controlling capability was added to the system such that an increment in the sensor output in a certain direction would accelerate the cursor movement in that direction.

2. Motion Detection: In this mode, in addition to the proximity requirement (of having the magnet close to one of the sensors), there is an additional requirement for the magnet to be in motion, i.e. the system looks for movement of the magnet in addition to its position relative to the sensors. For example, the cursor will not move no matter how close the magnet may be to the sensor if the magnet is held steady. This mode was provided for better and more accurate control over cursor movements by resembling a computer mouse. For instance, this mode proves to be very effective when the curser has to be moved in small increments at a time. Motion detection is performed by comparing the derivative of the sensor array outputs with an adjustable threshold level.

Discussion of Example 1

Even though it is possible to determine the absolute position of the permanent magnet (on the tongue) in the confined space of the mouth cavity based on the sensor array outputs, this may not always be the desired way for controlling the cursor movements. This is because of a convenience issue. If the cursor position is solely determined by the absolute position of the magnet, when the tongue is moved back to its resting position, the cursor would also move back with it. In comparison to the way a computer mouse functions, such a movement may not be desirable, as the cursor position needs to be retained after each sweep of the magnet. Therefore, it can be desirable for the cursor to only follow the magnet relative movements compared to its previous position.

In a computer mouse, for moving the cursor over long distances across the screen it becomes necessary to lift the mouse off the surface, when it reaches the boundary of the mouse pad or normal working area, and reposition it somewhere in the middle. A single sensor could be used to detect both to and fro linear motion of the magnet. In an effort to address an issue of no practical way of actually lifting the magnet off the oral cavity space to stop its effect on the sensors, in some embodiments, at least two sensor outputs can be processed to derive each direction of linear movement. With additional signal processing, certain tongue movements can be defined as curser movement disabling/enabling actions.

The concerns stated above can be overcome partially or fully based on classifying certain tongue movements as those intended for cursor motion, and other movements for other tasks such as mouse right/left or single/double clicks. The deciphering of the type of tongue movement from sensor array output signals is provided in the signal processing software. One task of the software then can be to clearly and unambiguously distinguish/decouple one tongue movement from another.

Example 2

Subject Testing Apparatus

Mouthpiece

A prototype assistive apparatus was devised using off-the-shelf commercially available components to evaluate the feasibility and performance of the presently disclosed assistive devices. One purpose of the prototype device was to move a cursor on a computer screen based on the location of a tracer unit (a permanent magnet (see Table 2)) relative to four Hall-effect magnetic sensors (model A1321, Allegro Microsystems, Inc., Worcester, Mass., U.S.A.; see sensor datasheet for further details available from Allegro Microsystems website). Four Allegro A1321 ratiometric linear Hall-effect sensors with 5 mV/G sensitivity were installed along with 0.1 μF surface mount decoupling (SMD) capacitors in cavities created in a SHOCK DOCTOR MAX™ mouth guard (Shock Doctor, Inc., Plymouth, Minn., U.S.A.). The sensors readily provide temperature compensated linear voltage output proportional to the vertical magnetic field. The front two sensor outputs were used to control the cursor movements along the X direction and the rear two, movement along the Y direction. The arrangement of sensors was at the corners of a parallelogram. A set of six wires was used for supply and sensor output connections.

Control Hardware and Wireless Link

The ADC, control hardware, and wireless link were implemented using the CROSSBOW TELOS™ Research Platform (Crossbow Technology, Inc., San Jose, Calif., U.S.A.). This platform provides a low-power microcontroller (TI MSP430) including an 8-channel ADC, and an IEEE 802.15.4 radio transceiver with up to 250 kB/s data rate across 30 m indoor range for transmission and reception of the digitized sensor array data and adjustment/calibration commands. A TPR2400 mote and a TPR2420CA mote (Crossbow Technology, Inc.) were used, either of which could be configured as a transmitter or receiver. In this system, the internal mouthpiece only incorporates the Hall-effect sensors, which are hardwired to the transmitter mote and powered by 4 size-AA batteries in a pack that can be carried in a shirt pocket. The receiver mote sits in the USB port of a personal computer, which runs the assistive apparatus system software in LABVIEW®, and derives power directly from that port. The motes run the open-source TinyOS operating system, code for which is written in the NesC language.

TABLE 2

| 64-1895 ⅛" RARE EARTH SUPER MAGNET* SPECIFICATIONS | |
| --- | --- |
| Material | Neodymium-Iron-Boron |
| Residual Induction (Br) | 10,800 Gauss |
| Coercive Force (HC) | 9,600 Oersted |
| Peak Energy Density (BHmax) | 30 MGO |
| Magnetizing Force (HS) | 35,000 Oersted |
| Curie Temperature | 310° C. |
| Density | 7.4 g/cm3 |
| Diameter | 4.7 mm |
| Thickness | 1.2 mm |

*RadioShack, Fort Worth, Texas, U.S.A.

Software

The transmitter mote scans through an array of 4 ADC channels in a round-robin fashion. The data is organized into packets and transmitted wirelessly to the receiver. A radio-to-serial link program running on the receiver mote sends the packets containing sensor readings to the USB port. The code for Telos-B/LABVIEW® interfacing has been written by making use of the LABVIEW® serial port access resources. The packet data is deciphered to interpret the sensor readings contained therein before being passed to the cursor control GUI code.

The GUI has 2 modes of operation. (1) Proximity Detection (PD) Mode: The cursor movement is controlled by the sensor closest to the magnet, with a "deadzone" for the resting position of the tongue in which none of the sensors have control over the cursor. For example, if the magnet is within a certain range of the front left sensor as set by a software threshold, the cursor moves to the left. (2) Motion Detection (MD) Mode: In addition to the proximity requirement, there is a need for the magnet to be in motion, i.e. the system looks for movement of the magnet in addition to its position relative to the sensors. The cursor will not move no matter how close the magnet may be to the sensor if the magnet is held steady. This mode is provided for better control over cursor movement, for instance when it has to be moved in small increments at a time. Motion detection is performed by comparing the derivative of each sensor output to a threshold.

Figure 7:
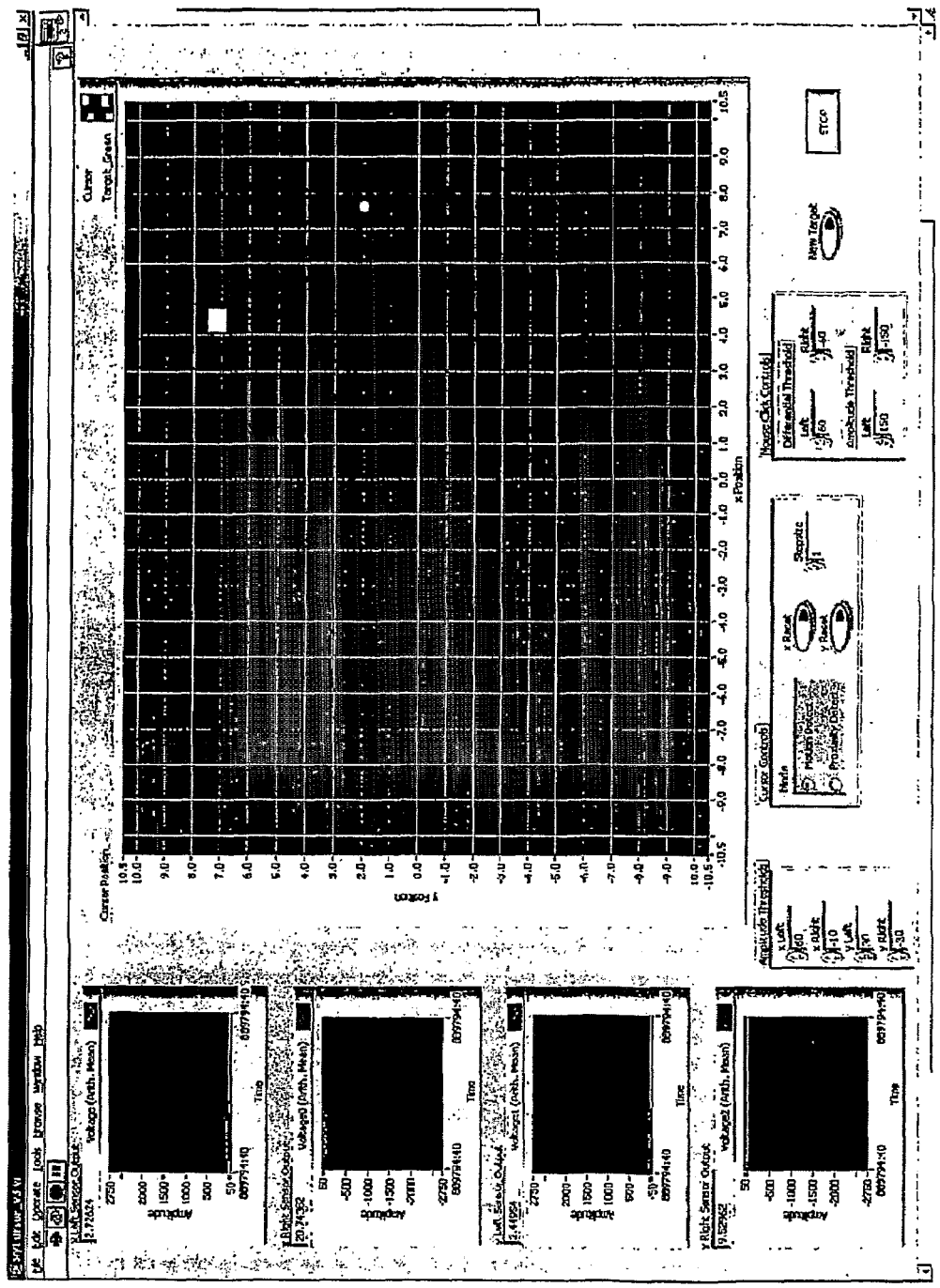
FIG. 7 is a drawing of a graphical user interface (GUI) developed for testing an assistive apparatus disclosed herein. Sensor array outputs are shown on the left column. A square shaped target appears on a random location of the screen and the subject utilizes their tongue to drive the circular cursor and hit the target.

The LABVIEW® GUI developed for the prototype Tongue Drive system is shown in FIG. 7. It displays a large rectangular marker as a target in a random position for tracking by a smaller circular cursor. Proportional control is incorporated in the system by accelerating the cursor (moving by a larger step-size) the closer the magnet is held to a sensor. The marker disappears and reappears at a different location when the subject reaches it with the cursor and executes a "tongue click". Left and right mouse-clicks are available in this system using the tongue movement. If the subject quickly flicks the magnet towards one of the front sensors starting from the deadzone, it is considered a tongue click. These special tongue movements allow the subject to "select" and "drag" an icon on screen represented by a target marker. The GUI software has tuning controls in the form of amplitude thresholds for PD mode, differential thresholds for MD mode, and thresholds for sensing tongue clicks.

It should be noted that adaptation and learning capability of the brain helps the subject to quickly learn how to use the presently disclosed assistive apparatus very effectively and quickly. Another advantage of the presently disclosed assistive apparatus is that a substantially unlimited number of specific tongue movements can be defined and dedicated to specific functions based on the subject's preferences and abilities. These movements can then be fine tuned over time for each individual subject. For example special tongue movements allow the subject to "select" and "drag" an icon on the screen. The GUI software also has several adjustable control parameters in the form of amplitude thresholds, gains, filter bandwidths, etc. that can optimize the performance of the apparatus in different conditions.

Example 3

Permanent Magnet and Hall-Effect Sensor Experiments

Magnetic Induction (B) and Magnetic Field Strength (H)

The magnetic fields generated by currents and calculated from Ampere's Law or the Biot-Savart Law are characterized by the magnetic field B measured in Tesla. But when the generated fields pass through magnetic materials which themselves contribute internal magnetic fields, ambiguities can arise about what part of the field comes from the external currents and what comes from the material itself. It has been common practice to define another magnetic field quantity, usually called the "magnetic field strength" designated by H. It can be defined by the relationship:

$$H = B_0/\mu_0 = B/\mu_0 - M$$

and has the value of unambiguously designating the driving magnetic influence from external currents in a material, independent of the material's magnetic response. The relationship for B can be written in the equivalent form:

$$B = \mu_0(H+M)$$

H and M will have the same units: amperes/meter (SI) or Oersted (CGS). To further distinguish B from H, B is called the magnetic flux density or the magnetic induction. The quantity M in these relationships is called the magnetization of the material.

Another commonly used form for the relationship between B and H is $$B = \mu H$$

where $$\mu = K_m \mu_0$$

$\mu_0$ being the magnetic permeability of space and $K_m$ the relative permeability of the material. If the material does not respond to the external magnetic field by producing any magnetization, then $K_m = 1$.

The B-H Curve

Figure 12:
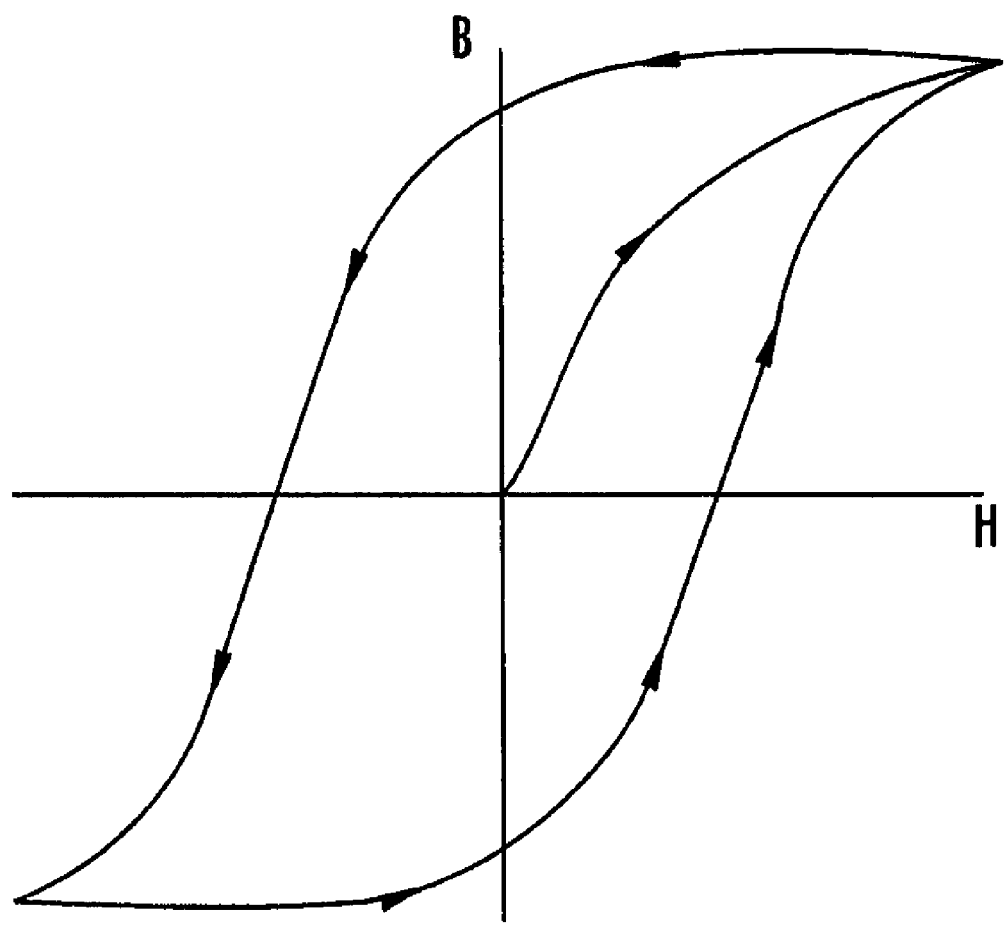
FIG. 12 is an illustration of the B-H curve.

The basis of permanent magnet design is the B-H curve, or hysteresis loop, which characterizes each magnet material. See FIG. 12. This curve describes the cycling of a magnet in a closed circuit as it is brought to saturation, demagnetized, saturated in the opposite direction, and then demagnetized again under the influence of an external magnetic field.

The second quadrant of the B-H curve, commonly referred to as the "Demagnetization Curve", describes the conditions under which permanent magnets are used in practice. A permanent magnet will have a unique, static operating point if air-gap dimensions are fixed and if any adjacent fields are held constant. Otherwise, the operating point will move about the demagnetization curve, the manner of which must be accounted for in the design of the device.

The three most important characteristics of the B-H curve are the points at which it intersects the B and H axes (at $B_r$—the residual induction—and $H_c$—the coercive force—respectively), and the point at which the product of B and H are at a maximum ($BH_{max}$—the maximum energy product). $B_r$ represents the maximum flux the magnet is able to produce under closed circuit conditions. In actual useful operation permanent magnets can only approach this point. $H_c$ represents the point at which the magnet becomes demagnetized under the influence of an externally applied magnetic field. $BH_{max}$ represents the point at which the product of B and H, and the energy density of the magnetic field into the air gap surrounding the magnet, is at a maximum. The higher this product, the smaller need be the volume of the magnet. Designs should also account for the variation of the B-H curve with temperature.

When plotting a B-H curve, the value of B is obtained by measuring the total flux in the magnet (ø) and then dividing this by the magnet pole area (A) to obtain the flux density (B=ø/A). The total flux is composed of the flux produced in the magnet by the magnetizing field (H), and the intrinsic ability of the magnet material to produce more flux due to the orientation of the domains. The flux density of the magnet is therefore composed of two components, one equal to the applied H, and the other created by the intrinsic ability of ferromagnetic materials to produce flux. The intrinsic flux density is given the symbol $B_i$ where total flux $B = H + B_i$, or, $B_i = B - H$. In normal operating conditions, no external magnetizing field is present, and the magnet operates in the second quadrant, where H has a negative value. Although strictly negative, H is usually referred to as a positive number, and therefore, in normal practice, $B_i = B + H$. It is possible to plot an intrinsic as well as a normal B-H curve.

One Dimensional Measurements of Magnetic Field Strength

The strength of a magnetic field drops off exponentially over distance. For magnet materials with straight-line normal demagnetization curves such as Rare Earths and Ceramics it is possible to calculate with reasonable accuracy the flux density at a distance X from the pole surface (where X>0) on the magnet's centerline under a variety of conditions.

For a cylindrical or disc shaped magnet with a radius of R and Length L, the magnetic induction at the centerline of the magnet a distance X from the surface can be calculated by the following formula, where $B_r$ is the Residual Induction of the material $$B_x = \frac{B_r}{2}\left[\left(\frac{L+X}{\sqrt{R^2+(L+X)^2}}\right) - \frac{X}{\sqrt{R^2+X^2}}\right]$$

where:

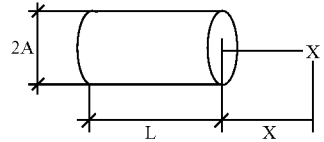

In order to verify the theory as given by the above equation with experimental results, a wooden apparatus was constructed with the Hall-effect sensor attached to one wooden stand and the magnet to another, as disclosed in Example 1. Using this setup, the Hall Sensor was fixed in position and the magnet was shifted at different distances from the sensor, along a straight line.

Figure 8A:
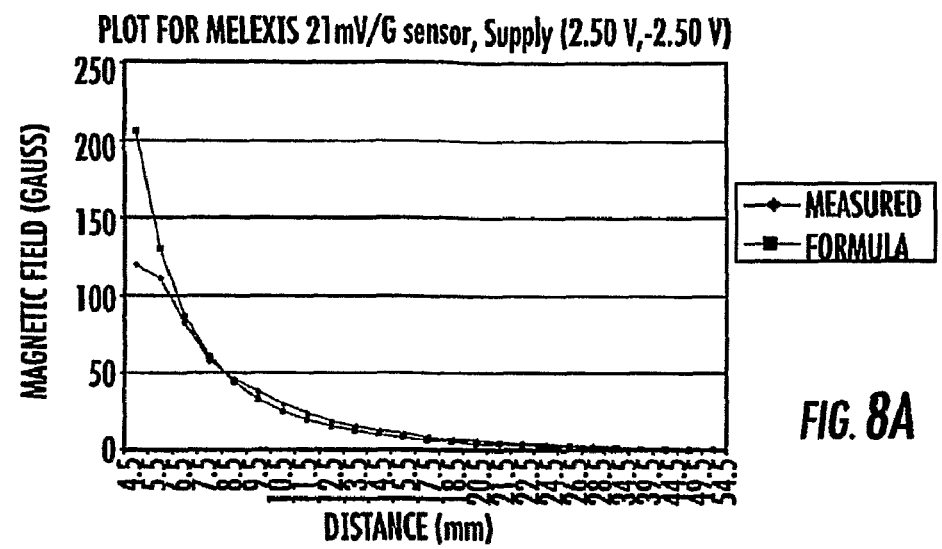
FIGS. 8A-8C are graphs showing magnetic field intensity ($B_x$) vs. distance (x) plots for Melexis 21 mV/G (FIG. 8A), Melexis 9 mV/G (FIG. 8B), and Allegro 1.31 mV/G (FIG. 8C) Hall-effect sensors.
Figure 8B:
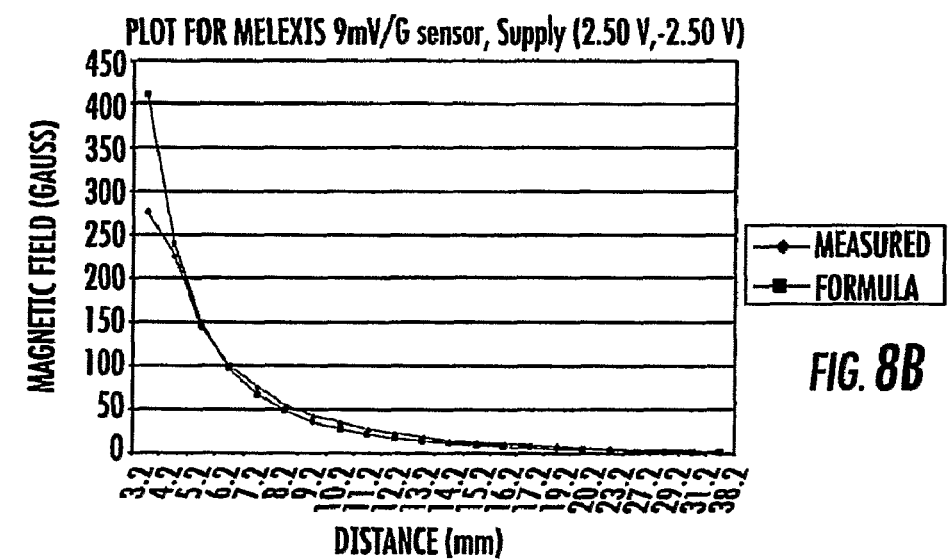
Figure 8C:
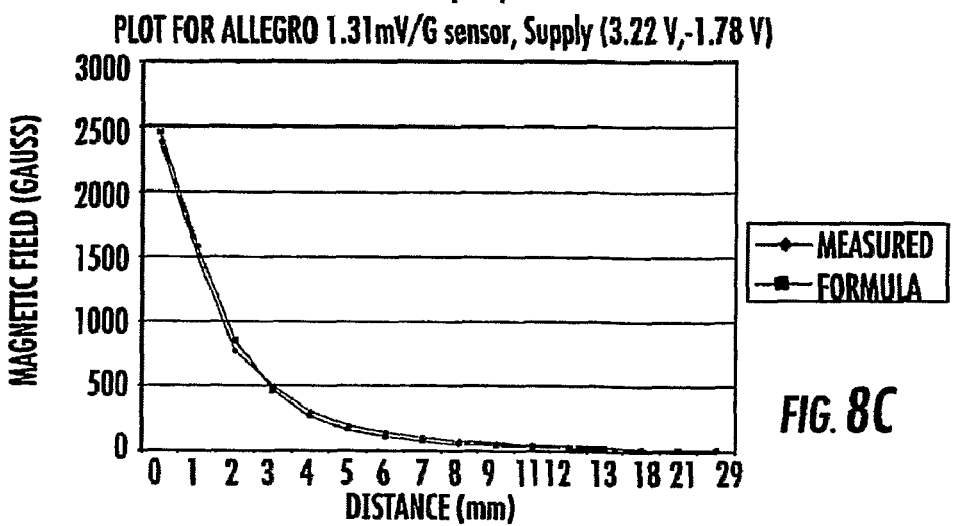

The permanent magnet used was a Single ⅛" rare earth magnet (model 64-1895 from RadioShack) which specifications are summarized in Table 2. The Hall-effect sensors used were from Melexis (Concord, N.H., U.S.A.) with 21 mV/G and 9 mV/G sensitivities, and from Allegro Microsystems with 1.31 mV/G sensitivity. For all 3 sensors, the experimental results, shown in FIGS. 8A-8C, matched theoretical predictions with reasonable accuracy.

Two Dimensional Measurements of Magnetic Field Strength

The same apparatus utilized in the 1-D measurements and disclosed in Example 1 was used to characterize the magnetic field of a permanent magnet in a plain (2-D). The utility of these experiments was to predict and observe trends of the magnetic induction, B, variations with respect to relative sensor and permanent magnet positions. When both sensor and magnet are located perpendicular to a 2-D plain, B changes with x, y, and φ, which are distance along X axis, distance along Y axis, and relative orientation of the sensor and magnet, respectively. Since no simple closed form equation for magnetic field in 2-D when sensor and magnet dimensions are comparable to their relative distance is available, the experimental data was compared with the results from the FEMLAB® Magnetostatics Modeling module (Comsol Inc., Stockholm, Sweden). FEMLAB® is an interactive environment to model single and coupled phenomena based on partial differential equations (PDE).

Figure 9A:
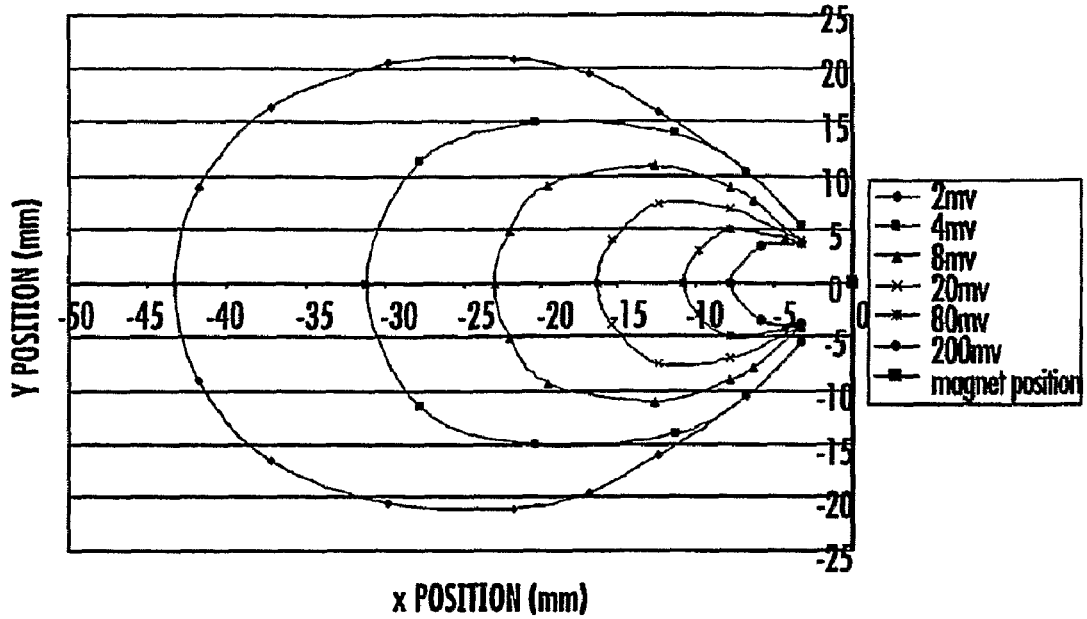
FIGS. 9A and 9B are graphs showing experimentally measured isopotential curves for magnet centerline perpendicular to the plane of a Hall-effect sensor, i.e. sensor and magnet were in parallel planes (FIG. 9A) and FEMLAB isopotential curves for magnet centerline perpendicular to plane of a Hall-effect sensor (FIG. 9B).
Figure 9B:
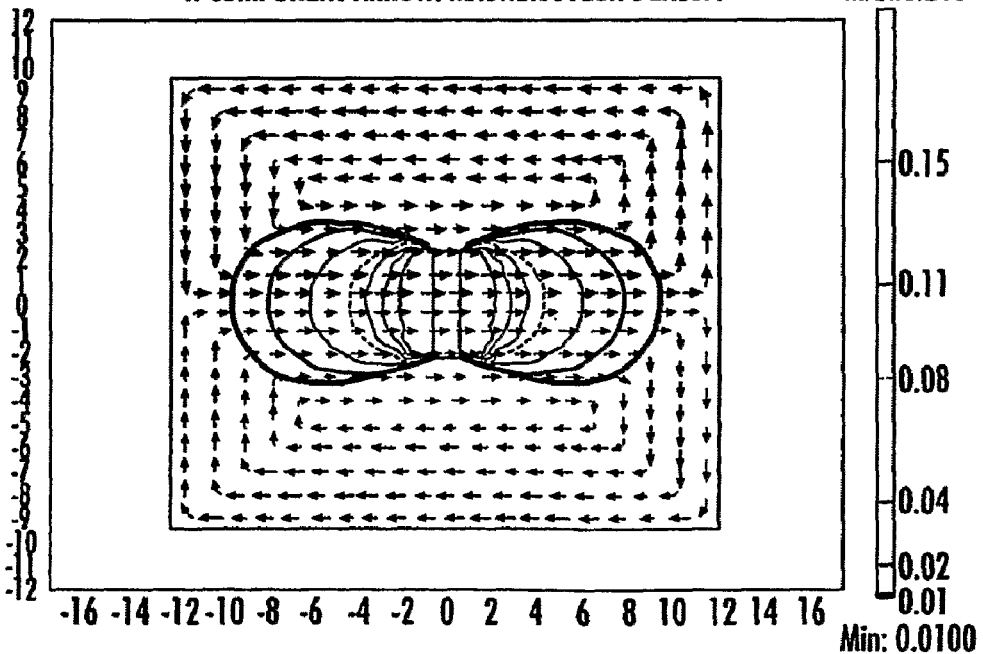

In all of the following experiments, the position of the sensor was kept constant and the magnet was moved with respect to the sensor while measuring the sensor output voltage, which is monotonically related to B according to the 1-D experiments disclosed herein. Then the magnet positions which resulted in constant sensor output voltage (constant B) where connected to one another to create a set of isopotential curves. A FEMLAB® 2-D model comparable to the RadioShack 64-1895 ⅛" rare earth magnet specifications was also constructed, which included the following parameters:

1. Magnet Length=1.2 mm
2. Magnet Height=4.7 mm
3. Magnet Material Relative Permeability=$\mu_r$=5000 (assumed)
4. Magnet Residual Induction=$B_r$=10800 Gauss Case I: Isopotential Curves for Magnet Centerline Perpendicular to Plane of Hall Sensor In this setup, the Hall Sensor (Allegro 1.31 mV/G, Supply=3.22 V, −1.78 V, Quiescent Output=0.83 mV) was fixed in position and the magnet (RadioShack 64-1895 ⅛") was positioned at different points in the 2-D plane at the same height as the sensor with its centerline always perpendicular to the plane of the Hall sensor, i.e. sensor and magnet were in parallel plains. FIG. 9A shows the experimental isopotential curves resulting from this experiment. The equivalent FEMLAB® post-simulation result is seen in FIG. 9B. In order to obtain these curves, the x-component of the magnetic flux density was plotted as contours, since the Hall sensor only responds to the flux density perpendicular to its plane.

Figure 10A:
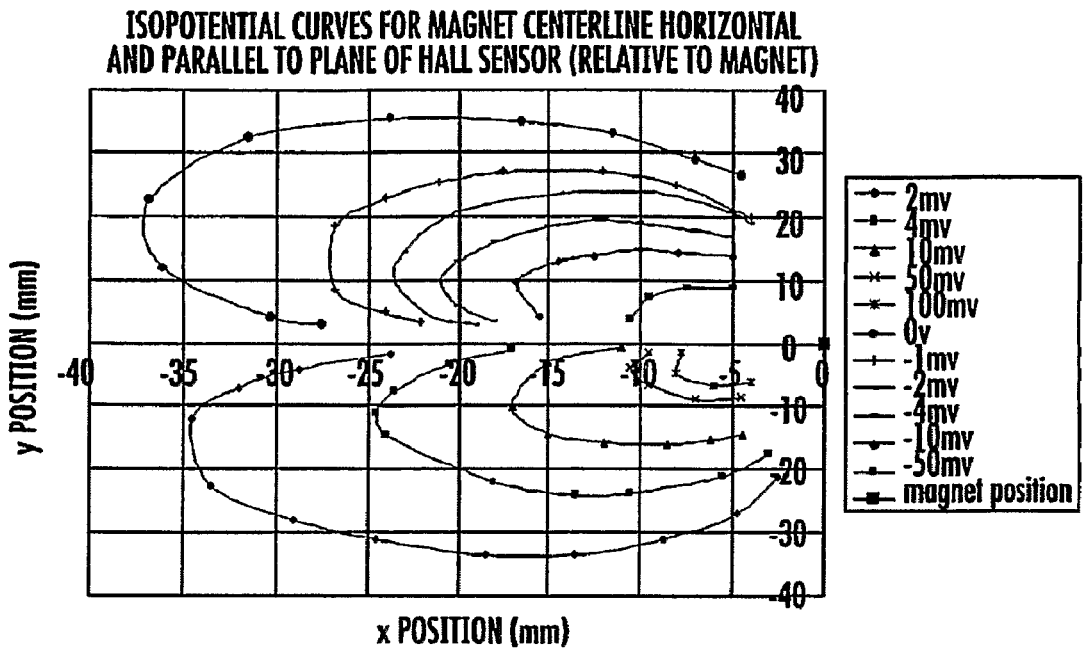
FIGS. 10A and 10B are graphs showing experimentally measured isopotential curves for magnet centerline horizontal and parallel to plane of a Hall-effect sensor, i.e. sensor and magnet were in perpendicular planes (FIG. 10A) and FEMLAB isopotential curves for magnet centerline horizontal and parallel to plane of a Hall-effect sensor (FIG. 10B).
Figure 10B:
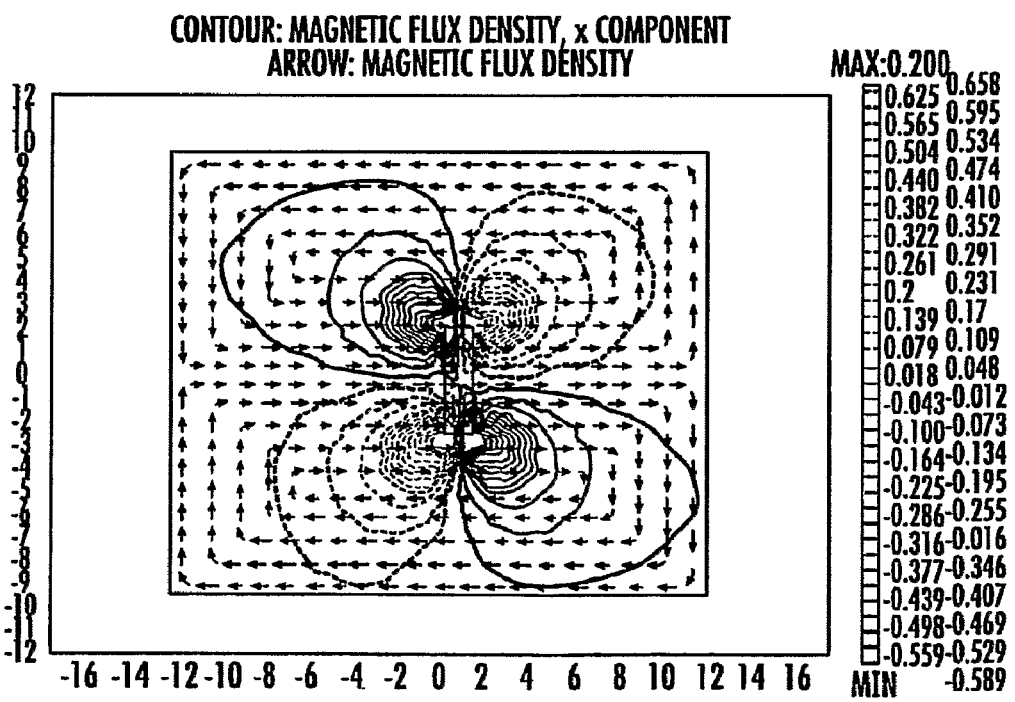

Case II: Isopotential Curves for Magnet Centerline Horizontal and Parallel to Plane of Hall-effect Sensor In this setup, the Hall Sensor was fixed in position and the magnet was positioned at different points in the 2-D plane at the same height as the sensor with its centerline always horizontal and parallel to the plane of the Hall sensor, i.e. sensor and magnet were in perpendicular plains. FIG. 10A shows the experimental isopotential curves resulting from this experiment. The equivalent FEMLAB® post-simulation result is shown in FIG. 10B. In order to obtain these curves, the y-component of the magnetic flux density was plotted as contours.

As can be seen from a comparison of simulation with experimental data, in Case I and Case II, the curves are similar in nature. The magnet model can be further refined and its parameters tweaked until an- exact a match is obtained, if desired.

Figure 11:
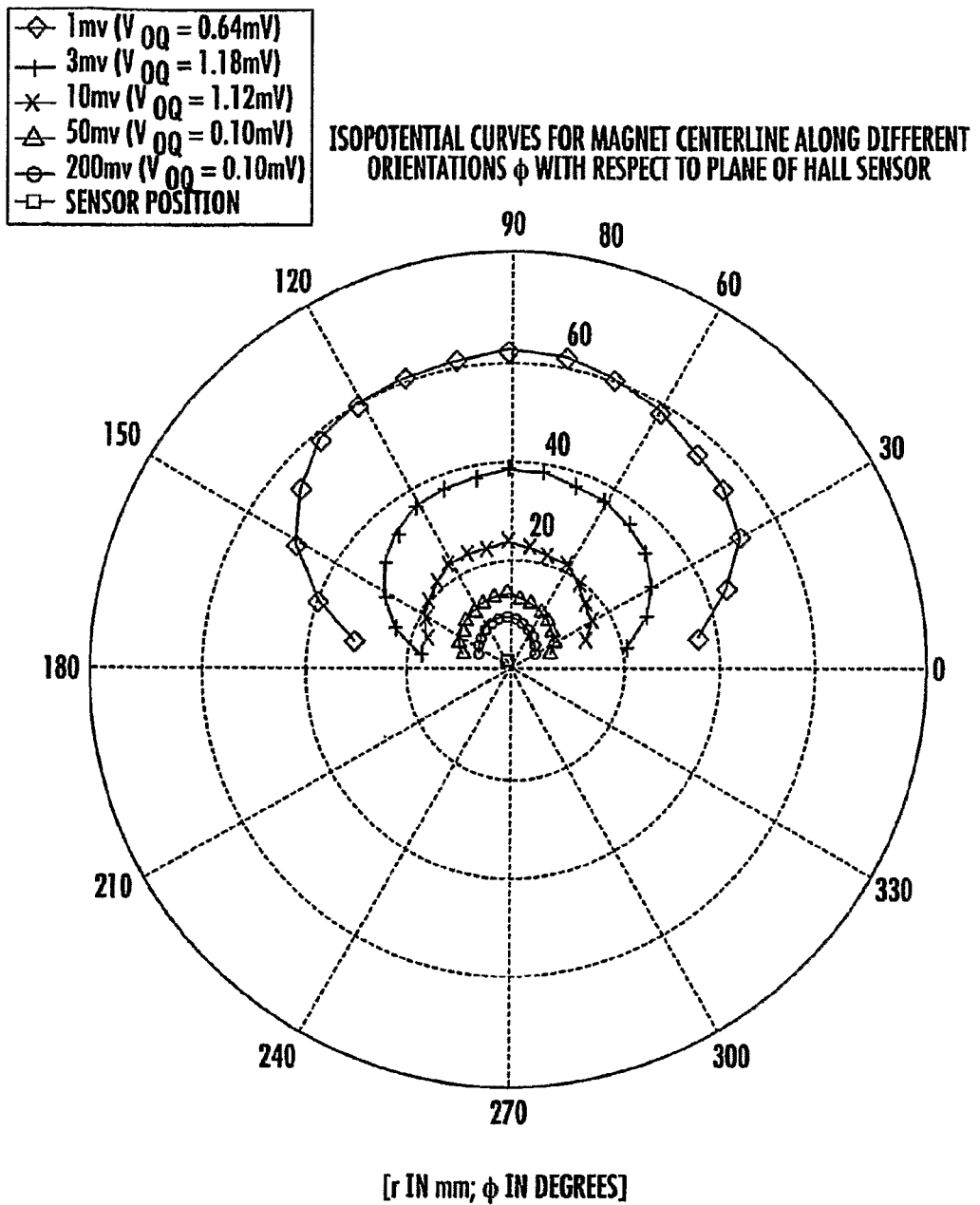
FIG. 11 is a graph showing experimentally measured isopotential curves for magnet centerline along different orientations φ with respect to plane of a Hall-effect sensor (relative to sensor).

Case IIII: Isopotential Curves for Magnet Centerline Along Different Orientations φ with Respect to Plane of Hall-effect Sensor In this setup, the Hall Sensor was fixed in position and the magnet was positioned at different points in the 2-D plane at the same height as the sensor with its centerline along different orientations φ with respect to plane of Hall sensor. FIG. 11 shows the experimental isopotential curves resulted from this experiment.

Example 4

Development of Next Generation Assistive Apparatus

The assistive apparatus disclosed herein can employ ECO™, an ultra-compact low-power wireless sensor node, which has been developed at the Center for Embedded Computer Systems at the University of California in Irvine, U.S.A. (UC-Irvine) for real-time motion monitoring of infants. An attractive feature of the ECO™ sensor node is its small size, which is only 12×12×7 mm³ including a 48 mAh rechargeable battery that can easily fit inside the mouth. ECO™ has a power management system in the form of a step up regulator, which produces a constant 3 V supply for the sensors regardless of 5 the gradually dropping battery voltage. The microcontroller used in ECO™ sensor node (nRF24E1; Nordic Semiconductor, Oslo, Norway) has a built-in 9-channel ADC and a 2.4 GHz transmitter with 1 Mbps data rate. Therefore, almost no additional circuitry is needed.

The average power consumption of the ECO™ sensor node with the transmitter on is about 14 mA and with the transmitter off is 4 mA. In the standby mode, ECO™ sensor node consumes only 60 μA. The A1391 Hall-effect sensor consumes 3.2 mA when operational and 25 μA in sleep mode. Therefore, ECO™ sensor node and 4 sensors consume 160 μA in standby mode and 17.3 mA when active (one sensor on at a time). If the firmware keeps the ECO™ sensor node in the standby and active modes in 90% and 10% of the times, respectively, the current consumption of the assistive apparatus mouthpiece will be ~2 mA. Thus a 48 mAh battery can last ~24 hours. Therefore, the battery needs recharging only every 2 or 3 days. Alternatively, a 560 mAh non-rechargeable battery can last 280 hours or more than 2 weeks before it needs to be replaced.

The assistive apparatus disclosed herein can also include a control unit designed specifically for the presently disclosed applications based on a custom PCB using a combination of custom and commercial ASICs. This design can be even smaller and consume less power than an apparatus using the ECO™ sensor node because the ECO™ sensor node has several components such as acceleration and light sensors that are not necessary for the assistive apparatus disclosed herein. In addition, smaller and more capable, micro-controllers and commercial ASICs with even lower power consumption will be developed and can be incorporated into embodiments of the assistive apparatus.

The assistive apparatus disclosed herein can comprise microcontroller firmware for the sensor control unit, which can be developed in concert with the apparatus. This process can employ sample codes from the UC-Irvine project and the support available from the microcontroller's manufacturer (nRF24E1: 2.4 GHz Transmitter/MCU/ADC available from Nordic Semiconductor). The firmware can be developed to facilitate providing continuous real-time sensor data at a high rate to the appliance control unit, while saving power by maximizing the amount of time when different sensor control unit components are held in the sleep mode.

Example 5

Development of Signal Processing Algorithms for Detection of the 3-D Position and Orientation of Tracer Unit The apparatus tested in Example 2 was fully functional by simply associating each sensor output to one major direction (N, S, E, and W). However, using sensor outputs to indicate the 3-D position and orientation of the magnet inside the mouth can result in further benefits to the assistive apparatus, such as dedicating specific tongue trajectories to predefined commands and functions. The results produced by Schlager et al (2001), who have developed algorithms for detection of the trajectory of a magnetic tracer inside the gastrointestinal tract, can be employed in the present apparatus. For developing these algorithms powerful FEA modeling and simulation tools, such as Comsol Multiphysics (FEMLAB®) Electromagnetics module (Comsol Inc., Stockholm, Sweden) and MAXWELL® 3D (Ansoft, Pittsburgh, Pa., U.S.A.), can be utilized.

Example 6

Development of the GUI and Driver Software for Subject Interface

Required assistive apparatus software can be developed on a PC in C++, Java, MATLAB, and LABVIEW® under, for example the WINDOWS XP® 30 operating system (Microsoft Corporation, Redmond, Wash., U.S.A.).

After the software is developed and debugged on PC, it can be transferred to a smart device, for example a PDA, using WINDOWS® MOBILE® operating system. In order to save battery power on the sensor control unit, the unit can be configured to not perform any processing on the sensor signals. The raw samples can be directly transmitted to the external smart device, where all the processing algorithms are applied to the received signals after the samples are time division demultiplexed.

Mouse functions can be replaced with the assistive apparatus functions, such that the subject would not need to run any other software or learn any new environment or GUI other than the WINDOWS® operating system itself. The mouse functions can be only a small subset of the assistive apparatus functions. Considering the flexibility of the presently disclosed assistive apparatus capabilities, the subject can literally define a substantially unlimited number of functions by creating a library of his/her specific tongue movements.

Another component of the presently disclosed apparatus software is a library of drivers and applications to interface with other equipments and home/office appliances as shown in FIG. 6. Fortunately the PC is already a hub for replacing or communicating with most of home/office appliances and WINDOWS® already includes many of these drivers. However, additional device drivers can be specifically developed for the assistive apparatus, such as interfacing with a powered wheelchair or motorized bed.

Discussion of Examples

The presently disclosed assistive apparatus is a minimally invasive device developed to assist disabled subjects in leading an independent life and assist those subjects requiring use of additional appendages for complicated environment manipulation by facilitating control of their environments via their tongues. The presently disclosed subject matter is particularly effective for aiding a person that is paralyzed from neck below gain capabilities and maximum flexibility in effectively using a computer, which permits controlling most other appliances in their environment.

The presently disclosed technology can track tongue movements utilizing a tracer unit, such as a permanent magnet, affixed to the tongue and an array of sensors, such as magnetic sensors, positioned outside the mouth proximal the tracer unit and/or within the mouth attached on the outer surface of the teeth by way of a dental clip. The sensor outputs are a function of a continuous position-dependent property, for example the magnetic field of a permanent magnet. This allows the sensor array to characterize an unlimited number of tongue movements. Thus providing quicker, easier, and smoother proportional control over the subject's environment compared to many other available assistive technologies.

The presently disclosed assistive apparatus can help disabled subjects, and can also give an additional degree of control to able-bodied individuals when operating demanding machinery or vehicles. The assistive apparatus provides an additional mechanism to aid for example a pilot, astronaut, or scuba diver to communicate with a plane, spaceship, or submarine on-board computer, while operating other devices and controls with their hands and feet. It can also prove to be very useful in space or under water missions where the astronaut or scuba diver's hands and fingers are restricted in heavy and thick space or scuba diving suites. In addition, it can be used in agile combat aircraft in high-G conditions to help the crew communicate with the central command station.

Several embodiments of the assistive apparatus have been constructed, tested, and demonstrated effective as set forth in the Examples above. For example, a wooden test apparatus as well as a more realistic mouthguard-based mouth-piece were built and tested. Using these prototypes it was possible to move a cursor on a PC screen using a small magnet tracer unit. It was not only possible to effortlessly move the cursor, but also to "select" an object on the screen represented by a target marker or a button by specific tongue movements named "tongue clicks". These specific tongue movements which can be customized for every user can actually emulate mouse clicks in their functionality when using a computer.

Many experiments were also conducted to better understand the nature of the magnetic field generated by a permanent magnet and its affects on Hall-effect sensor outputs. These experiments were conducted using the FEMLAB magnetostatics modeling module to model the field characteristics of the permanent magnet. The results from these models were comparable to that obtained from theoretical calculations as well as actual experiments. These experiments and simulations provide data for use in placement of the magnetic sensors as well as information on how their outputs need to be processed in order to optimally interpret tongue movements.

Developed prototypes tested in the Examples successfully showed the feasibility and advantages of the presently disclosed subject matter. The sensor control unit hardware tested comprises off-the-shelf commercial components, which can be replaced with truly integrated custom designed electronics to further significantly reduce size of the device, as described herein. Packaging together of the sensor control unit and interconnects with the sensor array can provide better usability. The magnet can be placed in a biocompatible non-ferromagnetic enclosure that can be affixed to the tongue by adhesive, clamping, piercing, or embedding (e.g., implanting). The user interface can be further enhanced for various different applications.

REFERENCES

The references listed below, as well as all references cited in the specification, are incorporated herein by reference to the extent that they supplement, explain, provide a background for, or teach methodology, techniques, and/or compositions employed herein.

Betke et al., *IEEE Trans. Neural Sys. and Rehab*, vol. 10(1), pp.1-10, 2002.

Chen et al., *IEEE Trans. Rehab. Eng.*, vol. 7, pp. 474-481, 1999.

Chen, *IEEE Trans. Neural Sys. Rehab. Eng.*, vol. 9, pp. 289-294, September 2001.

Cook & Hussey, *Assistive Technologies: Principles and Practice*, 2nd ed. Mosby-Year Book, 2001.

Gips et al., *Human-Computer Interaction: Appl. and Case Studies*, Elsevier, pp.630-635, 1993.

Hutchinson et al., *IEEE Trans. Syst., Man, Cybern.*, vol. 19(6), pp.1527-1533, 1989.
Kandel et al., *Principles of Neural Science,* 4th ed. McGraw-Hill, 2000.
Lal et al., *Advances in Neural Information Processing Systems*, MIT Press, Cambridge, Mass., USA, pp. 737-744, 2005.
Lau & O'Leary, *Am J. Occup. Ther.,* 47, pp. 1022-1030, 1993.
Nutt et al., *J. Micromechanics and Microengineering,* vol. 8, no. 2, pp. 155-157, 1998.
Salem & Zhai, *Proc. CHI,* 97, pp. 22-27, 1997.
Schlager et al., *Sensors and Actuators A*, vol. 92, pp. 37-42, 2001.
Schlager et al., *Sensors and Actuators A*, vol. 92, pp. 37-42, 2001.
Schott et al., *IEEE Trans. On Sensors,* 2002.
Takami et al., *Proc. IEEE TENCON'96,* DSP Applications, vol. 1, pp. 468-472, 1996.
Xie et al., *IEEE Trans. Syst., Man and Cybern.,* vol. 25(12), 1995.

It will be understood that various details of the presently disclosed subject matter may be changed without departing from the scope of the present subject matter. Furthermore, the foregoing description is for the purpose of illustration only, and not for the purpose of limitation.

What is claimed is:

1. An assistive apparatus for remote control of an appliance by a subject, comprising:
   (a) a tracer unit structurally adapted for non-obstructive affixation to the tongue of the subject such that a change in position of the tongue changes position of the tracer, wherein the tracer unit comprises a permanent magnet;
   (b) at least one sensor for detecting a position of the tracer unit, based on detecting the magnetic field of the magnet in the tracer unit by the at least one sensor, wherein the at least one sensor is structurally adapted for non-obstructive placement proximal the tracer unit; and
   (c) a sensor control unit for transmitting a sensor signal to an appliance based on the detected position of the tracer unit.

2. The apparatus of claim 1, wherein the magnet is a permanent magnet exhibiting straight-line normal demagnetization curve properties.

3. The apparatus of claim 1, wherein the magnet comprises a flexible magnet, a rare earth magnet or a ceramic magnet.

4. The apparatus of claim 3, wherein the rare earth magnet is a neodymium-iron-boron magnet or a samarium-cobalt magnet.

5. The apparatus of claim 1, comprising a post adapted for piercing the tongue to which the tracer unit is attached.

6. The apparatus of claim 1, wherein the tracer unit is adapted for affixation to the tongue by embedding the tracer unit within the tongue.

7. The apparatus of claim 1, wherein the tracer unit is adapted for affixation to the tongue by a tissue adhesive.

8. The apparatus of claim 1, wherein the tracer unit is encased within a biocompatible material.

9. The apparatus of claim 8, wherein the biocompatible material comprises gold, platinum, a ceramic, a polymeric material, or combinations thereof.

10. The apparatus of claim 1, wherein the at least one sensor is adapted for incorporation into a dental fixture fitted into the mouth of the subject.

11. The apparatus of claim 1, wherein the at least one sensor is adapted for positioning outside the mouth of the subject.

12. The apparatus of claim 1, wherein the at least one sensor is a plurality of sensors.

13. The apparatus of claim 12, comprising power management circuitry for controlling power distribution to the plurality of sensors.

14. The apparatus of claim 1, wherein the at least one sensor is a Hall-effect magnetic sensor, a magnetoinductive sensor, or a magnetoresistive sensor.

15. The apparatus of claim 1, wherein the sensor control unit processes the sensor signal from an analog signal to a digital signal.

16. The apparatus of claim 1, wherein the sensor control unit comprises a wireless transmitter for transmitting the sensor signal by wireless communication.

17. The apparatus of claim 1, comprising the appliance.

18. The apparatus of claim 17, wherein the appliance is selected from the group consisting of a personal computer, a wheelchair, a bed, a telephone, a home appliance, and a speech synthesizer.

19. The apparatus of claim 17, wherein the appliance is a personal computer and the apparatus effects control of software on the personal computer that tracks movement, position, or both of the tongue.

20. The apparatus of claim 1, comprising an appliance control unit for receiving the sensor signal from the sensor control unit, translating the sensor signal to a control signal, and transmitting the control signal to the appliance to thereby effect control of the appliance.

21. The apparatus of claim 20, wherein the appliance control unit receives the sensor signal by way of a receiver.

22. The apparatus of claim 21, wherein the receiver is a wireless receiver.

23. The apparatus of claim 20, wherein the appliance comprises the appliance control unit.

24. The apparatus of claim 20, wherein the appliance control unit is separate from the appliance.

25. The apparatus of claim 24, wherein the appliance control unit is a smart device.

26. The apparatus of claim 24, wherein the appliance control unit comprises a personal digital assistant, a mobile phone or a personal computer.

27. A method for remote control of an appliance by a subject, comprising:
   (a) providing in the mouth of a subject a tracer unit non-obstructively affixed to the tongue such that a change in position of the tongue changes position of the tracer unit, wherein the tracer unit comprises a permanent magnet;
   (b) detecting the position of the tracer unit based on detecting the magnetic field of the magnet in the tracer unit by a sensor;
   (c) generating a sensor signal based on the detected position of the tracer unit; and
   (d) transmitting the sensor signal to an appliance, wherein the sensor signal effects control of the appliance.

28. The method of claim 27, wherein an assistive apparatus is utilized for remote control of the appliance, the assistive apparatus comprising:
   (i) the tracer unit;
   (ii) at least one sensor for detecting the position of the tracer unit based on detecting the magnetic field of the magnet in the tracer unit by the sensor and structurally adapted for non-obstructive placement proximal the tracer unit; and
   (iii) a sensor control unit for transmitting the sensor signal to the appliance based on the detected position of the tracer unit.

29. The method of claim 27, wherein the magnet is a permanent magnet exhibiting straight-line normal demagnetization curve properties.

30. The method of claim 27, wherein the magnet comprises a flexible magnet, a rare earth magnet or a ceramic magnet.

31. The method of claim 30, wherein the rare earth magnet is a neodymium-iron-boron magnet or a samarium-cobalt magnet.

32. The method of claim 27, wherein the tracer unit is affixed to the tongue by piercing the tongue with a post to which the tracer unit is attached.

33. The method of claim 27, wherein the tracer unit is embedded in the tongue.

34. The method of claim 27, wherein the tracer unit is affixed to the tongue by a tissue adhesive.

35. The method of claim 27, wherein the tracer unit is encased within a biocompatible material.

36. The method of claim 35, wherein the biocompatible material comprises gold, platinum, a ceramic, a polymeric material, or combinations thereof.

37. The method of claim 28, wherein the at least one sensor is incorporated into a dental fixture fitted into the mouth of the subject.

38. The method of claim 28, wherein the at least one sensor is positioned outside the mouth of the subject.

39. The method of claim 28, wherein the at least one sensor is a plurality of sensors.

40. The method of claim 39, comprising power management circuitry for controlling power distribution to the plurality of sensors.

41. The method of claim 28, wherein the at least one sensor is a Hall-effect magnetic sensor, a magnetoinductive sensor, or a magnetoresistive sensor.

42. The method of claim 28, wherein the sensor control unit processes the sensor signal from an analog signal to a digital signal.

43. The method of claim 28, wherein the sensor control unit comprises a wireless transmitter for transmitting the sensor signal by wireless communication.

44. The method of claim 27, wherein the appliance is selected from the group consisting of a personal computer, a wheelchair, a bed, a telephone, a home appliance, and a speech synthesizer.

45. The method of claim 27, wherein the appliance is a personal computer and the apparatus effects control of software on the personal computer that tracks movement, position, or both of the tongue.

46. The method of claim 28, wherein the assistive apparatus comprises an appliance control unit for receiving the sensor signal from the sensor control unit, translating the sensor signal to a control signal, and transmitting the control signal to the appliance.

47. The method of claim 46, wherein the appliance control unit receives the sensor signal by way of a receiver.

48. The method of claim 47, wherein the receiver is a wireless receiver.

49. The method of claim 46, wherein the appliance comprises the appliance control unit.

50. The method of claim 46, wherein the appliance control unit is separate from the appliance.

51. The method of claim 50, wherein the appliance control unit is a smart device.

52. The method of claim 50, wherein the appliance control unit comprises a personal digital assistant, a mobile phone or a personal computer.

53. A method for tracking movement, position, or both of a tongue in a subject, comprising:
(a) providing in the mouth of a subject a tracer unit non-obstructively affixed to the tongue such that a change in position of the tongue changes position of the tracer, wherein the tracer unit comprises a permanent magnet;
(b) detecting the position of the tracer unit based on detecting the magnetic field of the magnet in the tracer unit by a sensor;
(c) generating a signal based on the detected position of the tracer unit; and
(d) analyzing the signal to thereby track movement, position, or both of the tongue.

54. The method of claim 53, comprising transmitting the signal to a computer, wherein the computer analyzes the signal.

55. The method of claim 53, comprising repeating steps (a)-(d) a desired number of times to track tongue movement, position, or both over a time period to generate a tongue movement pattern.

56. The method of claim 55, comprising comparing the tongue movement pattern to a standard tongue movement pattern as part of a speech analysis program, a speech therapy program, or both.

57. The method of claim 53, wherein an assistive apparatus is utilized for tracking movement, position, or both of the tongue, the apparatus comprising:
(i) the tracer unit;
(ii) at least one sensor for detecting the position of the tracer unit based on detecting the magnetic field of the magnet in the tracer unit by the at least one sensor and structurally adapted for non-obstructive placement proximal the tracer unit; and
(iii) a sensor control unit for transmitting the signal to the computer based on the detected position of the tracer unit.

58. The method of claim 53, wherein the magnet is a permanent magnet exhibiting straight-line normal demagnetization curve properties.

59. The method of claim 53, wherein the magnet comprises a flexible magnet, a rare earth magnet or a ceramic magnet.

60. The method of claim 59, wherein the rare earth magnet is a neodymium-iron-boron magnet or a samarium-cobalt magnet.

61. The method of claim 53, wherein the tracer unit is affixed to the tongue by piercing the tongue with a post to which the tracer unit is attached.

62. The method of claim 53, wherein the tracer unit is embedded in the tongue.

63. The method of claim 53, wherein the tracer unit is affixed to the tongue by a tissue adhesive.

64. The method of claim 53, wherein the tracer unit is encased within a biocompatible material.

65. The method of claim 64, wherein the biocompatible material comprises gold, platinum, a ceramic, a polymeric material, or combinations thereof.

66. The method of claim 57, wherein the at least one sensor is incorporated into a dental fixture fitted into the mouth of the subject.

67. The method of claim 57, wherein the at least one sensor is positioned outside the mouth of the subject.

68. The method of claim 57, wherein the at least one sensor is a plurality of sensors.

69. The method of claim 68, comprising power management circuitry for controlling power distribution to the plurality of sensors.

70. The method of claim 57, wherein the at least one sensor is a Hall-effect magnetic sensor, a magnetoinductive sensor, or a magnetoresistive sensor.

71. The method of claim 57, wherein the sensor control unit processes the sensor signal from an analog signal to a digital signal.

72. The method of claim 57, wherein the sensor control unit comprises a wireless transmitter for transmitting the signal by wireless communication.

* * * * *